US012198849B2

(12) United States Patent
Miyazaki

(10) Patent No.: US 12,198,849 B2
(45) Date of Patent: Jan. 14, 2025

(54) METHOD FOR MANUFACTURING A TRANSFORMER

(71) Applicant: SUMIDA CORPORATION, Tokyo (JP)

(72) Inventor: Hiroyuki Miyazaki, Natori (JP)

(73) Assignee: SUMIDA CORPORATION (JP)

( * ) Notice: Subject to any disclaimer, the term of this patent is extended or adjusted under 35 U.S.C. 154(b) by 402 days.

(21) Appl. No.: 17/570,495

(22) Filed: Jan. 7, 2022

(65) Prior Publication Data

US 2022/0130602 A1 Apr. 28, 2022

Related U.S. Application Data

(62) Division of application No. 15/890,442, filed on Feb. 7, 2018, now Pat. No. 11,257,618.

(30) Foreign Application Priority Data

Mar. 30, 2017 (JP) ................................ 2017-067729

(51) Int. Cl.
*H01F 7/06* (2006.01)
*H01F 5/02* (2006.01)
(Continued)

(52) U.S. Cl.
CPC ............... *H01F 27/34* (2013.01); *H01F 5/02* (2013.01); *H01F 27/24* (2013.01); *H01F 27/28* (2013.01);
(Continued)

(58) Field of Classification Search
CPC ........ H01F 27/325; H01F 27/34; H01F 41/02; H01F 41/061; H01F 27/24; H01F 27/28;
(Continued)

(56) References Cited

U.S. PATENT DOCUMENTS 3,648,209 A * 3/1972 Conger ..................... H01F 5/06
336/60
4,808,954 A 2/1989 Ito
(Continued)

FOREIGN PATENT DOCUMENTS

CN 105358821 A 2/2016
JP S59-159907 U 10/1984
(Continued)

OTHER PUBLICATIONS

Extended European Search Report for EP Application No. 18156643.1, dated Aug. 8, 2018 (8 pages).
(Continued)

*Primary Examiner* — Paul D Kim
(74) *Attorney, Agent, or Firm* — Harness, Dickey & Pierce, P.L.C.

(57) ABSTRACT

A method is provided for manufacturing a transformer. The method includes preparing a core, a first coil portion that covers at least part of the core, and a second coil portion that covers a periphery of the first coil portion perpendicular to a central axis of winding of the first coil portion. The first and second coil portions each include a bobbin and a coil wound therearound. The coil of the first or second coil portion is an edgewise coil. The method also includes: screwing the bobbin and coil of the first coil portion with each other, and screwing the bobbin and coil of the second coil portion with each other; and attaching the second coil portion to the outside of the first coil portion perpendicular to the central axis of winding of the first coil portion, and attaching the core to sandwich the first and second coil portions in an axial direction of the first coil portion.

2 Claims, 16 Drawing Sheets

(51) Int. Cl.

| | |
|---|---|
| ***H01F 27/24*** | (2006.01) |
| ***H01F 27/28*** | (2006.01) |
| ***H01F 27/32*** | (2006.01) |
| ***H01F 27/34*** | (2006.01) |
| ***H01F 41/02*** | (2006.01) |
| ***H01F 41/061*** | (2016.01) |

(52) U.S. Cl.
CPC ....... *H01F 27/2847* (2013.01); *H01F 27/325* (2013.01); *H01F 41/02* (2013.01); *H01F 41/061* (2016.01); *H01F 2005/025* (2013.01)

(58) Field of Classification Search
CPC ... H01F 27/2847; H01F 5/02; H01F 2005/025
See application file for complete search history.

(56) References Cited

U.S. PATENT DOCUMENTS

| | | | | |
|---|---|---|---|---|
| 5,673,013 | A | 9/1997 | Moody et al. | |
| 6,344,786 | B1 | 2/2002 | Chin | |
| 6,927,650 | B2 | 8/2005 | Okamoto | |
| 7,567,164 | B2 | 7/2009 | Chin | |
| 8,698,586 | B2 * | 4/2014 | Park | H05B 41/02 336/192 |
| 2005/0212637 | A1 * | 9/2005 | Hsueh | H01F 27/306 336/182 |
| 2009/0066290 | A1 * | 3/2009 | Altekruse | H01F 27/325 320/108 |
| 2013/0104863 | A1 | 5/2013 | Arroyo et al. | |
| 2013/0293330 | A1 | 11/2013 | Wu et al. | |
| 2013/0328654 | A1 | 12/2013 | Iwakura et al. | |
| 2015/0380156 | A1 | 12/2015 | Takiguchi et al. | |
| 2016/0153416 | A1 | 6/2016 | Alla et al. | |

FOREIGN PATENT DOCUMENTS

| | | | |
|---|---|---|---|
| JP | S59-0094119 | A | 1/1986 |
| JP | S61-009818 | U | 1/1986 |
| JP | S61-181110 | A | 8/1986 |
| JP | H04-131919 | U | 12/1992 |
| JP | H08-069930 | A | 3/1996 |
| JP | H08-124760 | A | 5/1996 |
| JP | H08-264338 | A | 10/1996 |
| JP | 2004-111451 | A | 4/2004 |
| JP | 2006-147927 | A | 6/2006 |
| JP | 2011-124485 | A | 6/2011 |
| JP | 2014-082266 | A | 5/2014 |
| JP | 2014-093405 | A | 5/2014 |
| JP | 2014-192498 | A | 10/2014 |
| JP | 2015-115340 | A | 6/2015 |

OTHER PUBLICATIONS

Korean Office Action for Korean Patent Application No. 10-2017-0150414; dated Jan. 7, 2019 (13 pages).

Japanese Office Action for application JP2017-067729 mailed on Dec. 1, 2020, (4 pages with English translation).

First European Office Action for EP Application No. 18156643.1 dated Mar. 31, 2021 (11 pages).

* cited by examiner

METHOD FOR MANUFACTURING A TRANSFORMER

CROSS-REFERENCE TO RELATED APPLICATIONS

The present application is a divisional of application Ser. No. 15/890,442, filed Feb. 7, 2018, now U.S. Pat. No. 11,257,618, which is based on, and claims priority from JP Application Serial Number 2017-067729, filed Mar. 30, 2017, the disclosures of which are hereby incorporated by reference herein in their entireties.

BACKGROUND

Technical Field

The present invention relates to a transformer and a method for manufacturing a transformer.

Related Art

With an increase in frequency that high-frequency inverters and DC/DC converters deal with, it is getting essential to reduce loss in transformers for impedance conversion at a high frequency range (MHz band), in order to obtain a high efficiency.

Conventionally, litz wires are commonly used for transformer coils with the aim of overcoming skin effect, thereby improving loss. However, in the case where litz wires are used, proximity effect increases, and stray capacity also increases, making it difficult to reduce alternating-current resistance. Thus, coils using litz wire have a low quality factor.

Furthermore, Japanese Patent Application Laid-open No. 2006-147927 discloses a transformer that includes a core, an insulation spacer having plural recessed portions and protruding portions alternatingly provided on the external surface, and a rectangular winding (hereinafter referred to as an "edgewise coil") wound on the spacer. The transformer disclosed in JP 2006-147927 is configured in a manner such that the core and the spacer are provided so that the core is in contact with the inner surface of the spacer, and the edgewise coil is wound in recessed portions of the spacer. The edgewise coil, which forms the transformer, is attached on the spacer in a way of a so-called bifilar winding in which a primary winding and a secondary winding are alternatingly wound. With this edgewise coil, it is possible to reduce proximity effect and stray capacity while increasing the surface area, as compared with litz wire having the same sectional area.

SUMMARY

According to the present invention, there is provided a transformer including:

a core;

a first coil portion disposed so as to cover at least part of the core; and a second coil portion disposed so as to cover a periphery of the first coil portion in a direction perpendicular to a central axis of winding of the first coil portion, in which the first coil portion and the second coil portion each include a bobbin and a coil wound around the bobbin, and the coil of at least one of the first coil portion and the second coil portion is an edgewise coil.

In addition, according to the present invention, there is provided a method for manufacturing a transformer, which includes the steps of:

preparing a core, a first coil portion that covers at least part of the core; and a second coil portion disposed so as to cover a periphery of the first coil portion in a direction perpendicular to a central axis of winding of the first coil portion, the first coil portion and the second coil portion each including a bobbin and a coil wound around the bobbin, the coil of at least one of the first coil portion and the second coil portion being an edgewise coil;

screwing the bobbin of the first coil portion and the coil of the first coil portion with each other, and screwing the bobbin of the second coil portion and the coil of the second coil portion with each other; and attaching the second coil portion to the outside of the first coil portion in a direction perpendicular to the central axis of winding of the first coil portion, and attaching the core so as to sandwich the first coil portion and the second coil portion in an axial direction of the first coil portion.

Effect of the Invention

According to the present invention, the transformer includes the first coil portion and the second coil portion disposed so as to cover the periphery of the first coil portion in a direction perpendicular to a central axis of winding of the first coil portion, and at least one of these coil portions includes the edgewise coil. Thus, it is possible to provide a transformer and a method for manufacturing a transformer, which can suppress proximity effect and reduce stray capacity while reducing insertion loss.

DETAILED DESCRIPTION

Figure 1:
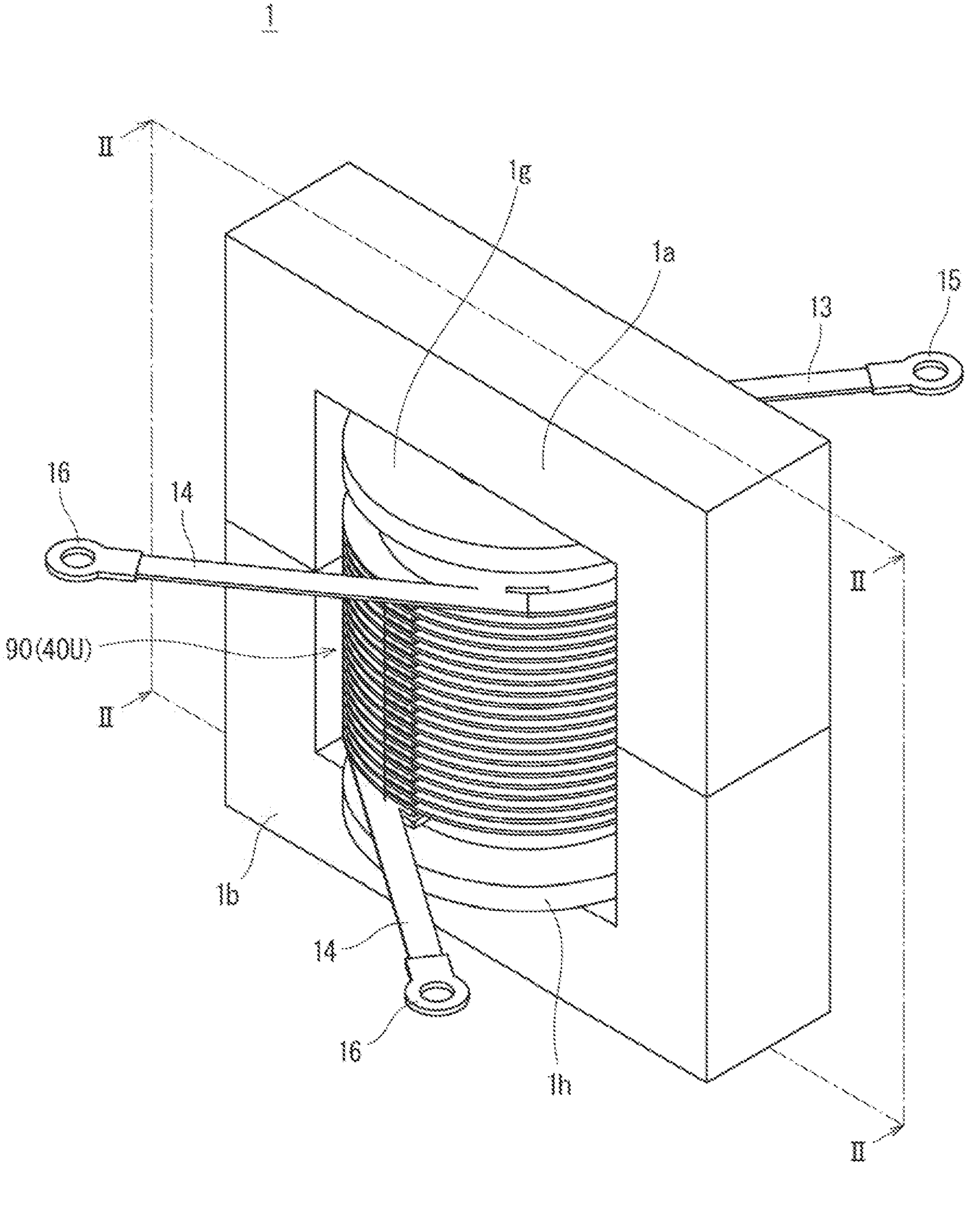
FIG. 1 is a perspective view illustrating a transformer according to a first exemplary embodiment.

In the case of the transformer described in JP 2006-147927, since the primary winding and the secondary winding are alternatingly wound on the spacer as described above, a large stray capacity is likely to occur between windings. This stray capacity causes unintentional oscillation to occur. In particular, in a high-frequency circuit, its influence is not negligible.

This stray capacity may be reduced by increasing spaces between windings. However, this increase in the spaces leads to increase in the length of the primary winding and the secondary winding in the axial direction, causing an increase in insertion loss.

The present invention has been made in view of the problem described above, and an object of the present invention is to provide a transformer and a method for manufacturing a transformer, which can reduce stray capacity occurring between coils, and can reduce insertion loss.

Hereinbelow, exemplary embodiments according to the present invention will be described with reference to the drawings. Note that, in all the drawings, the same reference characters are attached to similar constituting elements, and detailed explanation thereof will not be repeated as appropriate.

First Exemplary Embodiment

Schematic Configuration of Transformer

Figure 2:
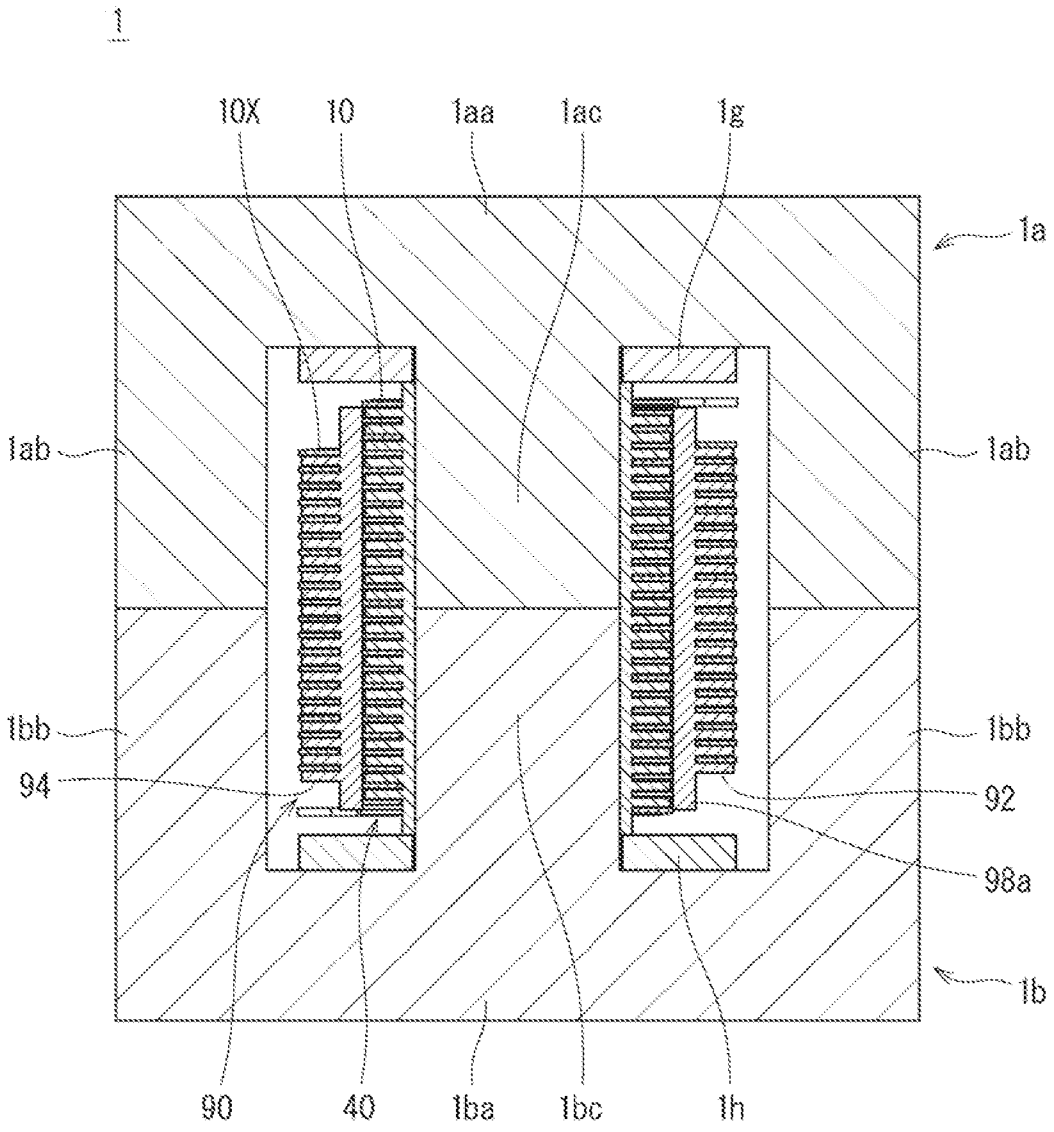
FIG. 2 is a vertical sectional view illustrating the transformer according to the first exemplary embodiment, taken along the cross section II-II in FIG. 1.

First, the schematic configuration of a transformer 1 according to exemplary embodiment of the present invention will be described with reference to FIGS. 1 and 2. FIG. 1 is a perspective view illustrating the transformer 1 according to the first exemplary embodiment. FIG. 2 is a vertical sectional view illustrating the transformer 1 and taken along the cross section II-II in FIG. 1.

As illustrated in FIG. 1 and FIG. 2, the transformer 1 includes a coil unit 40U including: a first coil portion 40; and a second coil portion 90 disposed radially outside of the first coil portion 40 so as to cover part of the outer periphery of the first coil portion 40. In this exemplary embodiment, the expression "radially outside of the first coil portion 40" corresponds to the outside of the periphery of the first coil portion and perpendicular to the central axis of winding of the first coil portion according to the present invention.

Furthermore, the transformer 1 includes an upper E core 1*a* and a lower E core 1*b*, which correspond to the core according to the present invention and are attached so as to sandwich the coil unit 40U from above and below.

Configuration of Core

The upper E core 1*a* and the lower E core 1*b* are made out of magnetic material, and are each formed into an E-shape when viewed from the front in FIG. 1. The upper E core 1*a* and the lower E core 1*b* are disposed in a manner such that the surfaces of the cores located on the open side of the character "E" are brought into contact with each other to form a symmetry with respect to the contacting surfaces. In other words, the core according to this exemplary embodiment is configured such that the upper E core 1*a* and the lower E core 1*b* are brought into contact with each other, thereby forming an annular loop core forming a closed magnetic circuit as a whole.

More specifically, the upper E core 1*a* includes: a yoke portion 1*aa* that extends in the left and right direction in FIG. 2; magnetic legs 1*ab*, each of which extends from each of both ends of the yoke portion 1*aa*; and a magnetic leg 1*ac* that extends from the central portion of the yoke portion 1*aa*. The magnetic legs 1*ab* and the magnetic leg 1*ac* each extend on one side (on the downward side in FIG. 2) of the yoke portion 1*aa* in a direction perpendicular to the direction in which the yoke portion 1*aa* extends.

Similarly, the lower E core 1*b* includes: a yoke portion 1*ba* that extends in the left and right direction in FIG. 2; magnetic legs 1*bb*, each of which extends from each of both ends of the yoke portion 1*ba*; and a magnetic leg 1*bc* that extends from the central portion of the yoke portion 1*ba*. The magnetic legs 1*bb* and the magnetic leg 1*bc* each extend on one side (on the upward side in FIG. 2) of the yoke portion 1*ba* in a direction perpendicular to the direction in which the yoke portion 1*ba* extends.

The upper E core 1*a* and the lower E core 1*b* are disposed in a manner such that the magnetic leg 1*ac* and the magnetic leg 1*bc* are inserted into a bobbin body 20*a*, which will be described later, and these legs are brought into contact with each other from above and below in FIG. 1, thereby forming the transformer 1. In other words, the first coil portion 40 is disposed so as to cover the magnetic leg 1*ac* and magnetic leg 1*bc* provided at the center of the upper E core 1*a* and the lower E core 1*b*, respectively. The outer diameters of the magnetic leg 1*ac* and the magnetic leg 1*bc* are each formed to be smaller than the inner diameter of the bobbin body 20*a* so that the magnetic leg 1*ac* and the magnetic leg 1*bc* can be inserted into the bobbin body 20*a*. In addition, the magnetic legs 1*ab* and the magnetic legs 1*bb* are brought into contact with each other from above and below radially outside of the second coil portion 90.

The central axis of the magnetic leg 1*ac* and the central axis of the magnetic leg 1*bc* each extend in the same direction as the winding axis, which is the central axis of winding of the edgewise coil 10 of the first coil portion 40, as well as the winding axis, which is the central axis of winding of the edgewise coil 10X of the second coil portion 90. In addition, the central axis of the magnetic leg 1*ac* and the central axis of the magnetic leg 1*bc* each pass through part of the magnetic flux paths of the upper E core 1*a* and the lower E core 1*b*, which form a loop core.

As described above, the upper E core 1*a* and the lower E core 1*b*, which serve as a core, form an annular-shaped loop core as a whole in a state of being brought into contact with each other. With the transformer 1 having the loop core, a closed magnetic circuit is formed, and hence, it is possible to reduce leakage flux.

It is preferable that the core according to the present invention is a loop core, because it can reduce the leakage flux. However, the core according to the present invention is not limited to a loop core, and it may be possible that the core according to the present invention is a rod-shaped core.

Configuration of First Coil Portion

Next, the configuration of the first coil portion 40 of the coil unit 40U will be described with reference to FIGS. 3 to 10.

The first coil portion 40 according to the exemplary embodiment includes the edgewise coil 10 and a bobbin 20 around which the edgewise coil 10 is wound.

The bobbin 20 includes a tubular bobbin body 20*a*, and a plurality of position-limiting protruding portions that are arranged in a plurality of portions on an outer peripheral surface of the bobbin body 20*a* and limit the position of each winding portion 11 of the edgewise coil 10 in the axial direction of the bobbin body 20*a*. The position-limiting protruding portions include, for example, a plurality of position-limiting protruding portions 21, a plurality of position-limiting protruding portions 22, a plurality of position-limiting protruding portions 23, and a plurality of position-limiting protruding portions 24. In this exemplary embodiment, the bobbin body 20*a* is disposed close to the outer periphery of the magnetic legs 1*ac*, 1*bc* having the cylindrical column shape, and hence, is formed into a tubular shape. However, the bobbin body according to the present invention is not limited to such a configuration. It is only necessary that the bobbin body is disposed close to the outer periphery of the magnetic legs. For example, the bobbin body may be formed into a hollow cubic shape, provided that it is disposed at the outer periphery of magnetic legs having a prism shape.

Figure 9:
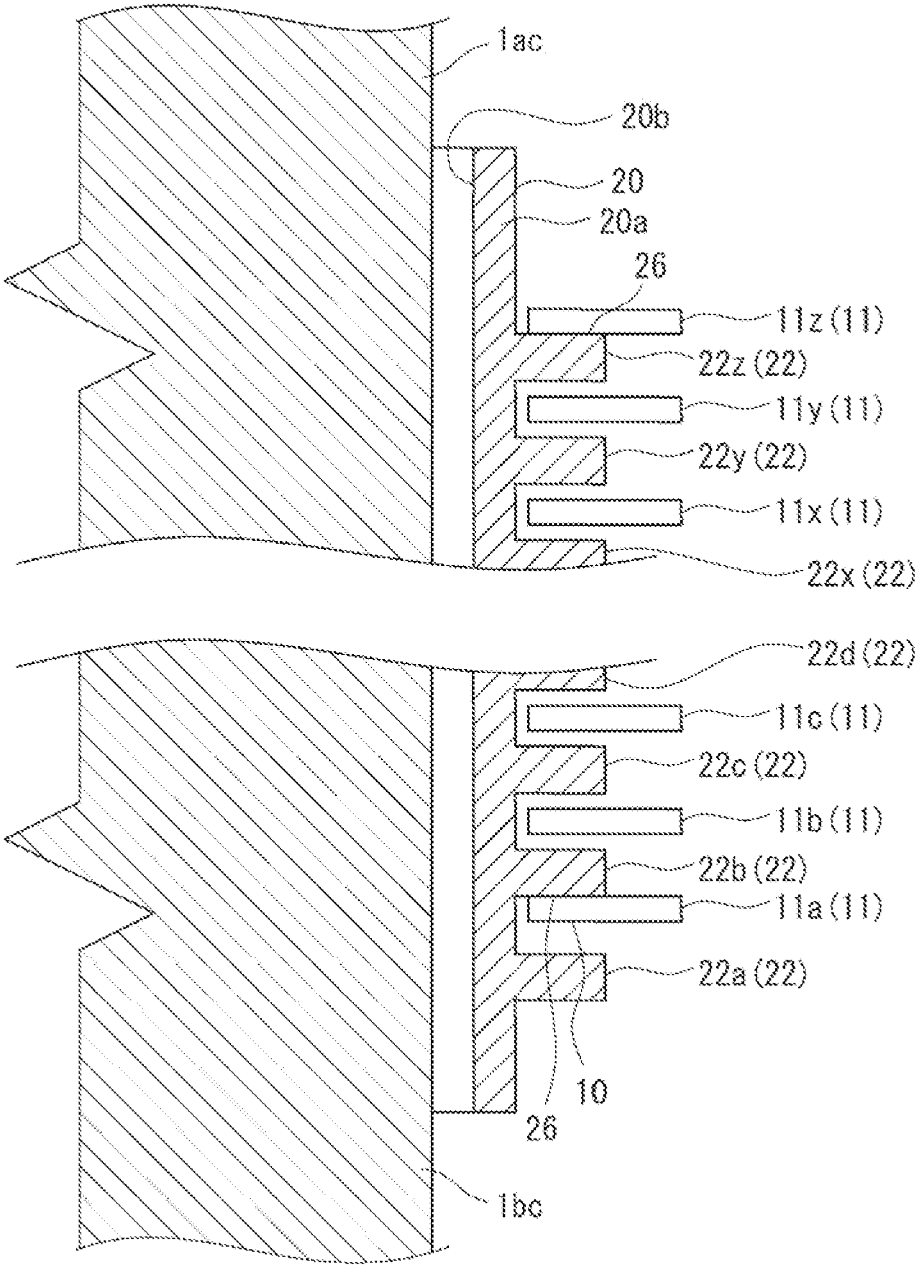
FIG. 9 is a front sectional view illustrating the coil portion according to the first exemplary embodiment.

The plurality of position-limiting protruding portions include a first position-limiting protruding portion (for example, the position-limiting protruding portion 22*b* illustrated in FIG. 9 or the like) and a second position-limiting protruding portion (for example, the position-limiting protruding portion 22*z* illustrated in FIG. 9 or the like), which are disposed at positions different from each other in the axial direction of the bobbin body 20*a*.

The edgewise coil 10 includes a first winding portion (for example, the winding portion 11*a* illustrated in FIG. 9) that is in pressure contact with the first position-limiting protruding portion toward the second position-limiting protruding portion. In addition, the edgewise coil 10 includes a second winding portion (for example, the winding portion 11*z* illustrated in FIG. 9) that is in pressure contact with the second position-limiting protruding portion toward the first position-limiting protruding portion. The edgewise coil 10 is in a state of space winding in which individual winding portions 11 from the first winding portion to the second winding portion are spaced apart from each other in the axial direction of the bobbin body 20*a*. Here, the space winding represents a way of winding, and is also called pitch winding.

Furthermore, each of the winding portions 11 is a portion of the edgewise coil 10 that makes one turn around the bobbin 20, and the edgewise coil 10 is an assembly of plural winding portions 11 arranged seamlessly in a spiral shape.

In addition, the first position-limiting protruding portion and the second position-limiting protruding portion may be arranged alongside each other in the axial direction of the bobbin body 20*a*, or may be arranged alongside each other in a direction intersecting the axial direction of the bobbin body 20*a*. Moreover, the direction of the second position-limiting protruding portion with respect to the first position-limiting protruding portion and the direction of the first position-limiting protruding portion with respect to the second position-limiting protruding portion may be the axial direction of the bobbin body 20*a*, or may be the direction intersecting this axial direction. Here, the direction of the second position-limiting protruding portion with respect to the first position-limiting protruding portion represents the direction in which the first winding portion is in pressure contact with the first position-limiting protruding portion. In addition, the direction of the first position-limiting protruding portion with respect to the second position-limiting protruding portion represents the direction in which the second winding portion is in pressure contact with the second position-limiting protruding portion.

The first coil portion 40 according to the exemplary embodiment includes the edgewise coil 10, and hence, can reduce the proximity effect and stray capacity, as compared with a coil formed from litz wire.

In addition, in the case of the first coil portion 40, the edgewise coil 10 is in a state of space winding in which individual winding portions 11 from the first winding portion and the second winding portion are spaced apart from each other in the axial direction of the bobbin body 20*a*. This configuration enables a stray capacity and a proximity effect between winding portions 11 to be reduced, and hence, it is possible to obtain the first coil portion 40 with a high quality factor, and also possible to reduce the size of the first coil portion 40. In addition, since individual winding portions 11 are spaced apart from each other, it is possible to achieve a favorable heat dissipation property.

Furthermore, the first winding portion of the edgewise coil 10 is in pressure contact with the first position-limiting protruding portion toward the second position-limiting protruding portion, and at the same time, the second winding portion of the edgewise coil 10 is in pressure contact with the second position-limiting protruding portion toward the first position-limiting protruding portion. With this configuration, it is possible to stably determine the positions of the first winding portion and the second winding portion with respect to the first position-limiting protruding portion and the second position-limiting protruding portion, respectively. Thus, it is possible to more stably maintain the position of each of the winding portions 11 of the edgewise coil 10.

The first coil portion 40 according to the exemplary embodiment, together with the second coil portion 90, which will be described later, can be favorably used in the transformer 1, which will be described later. In addition, the first coil portion 40 can be used at high frequencies (for example, a band of MHz) and with large electric power (the order of kW or higher), and has a structure that has reduced loss. In such a resonant coil, the alternating-current resistance due to stray capacity, proximity effect, and core loss causes a large loss. However, in the case of the first coil portion 40 according to the exemplary embodiment, the stray capacity and the proximity effect between winding portions 11 can be reduced, so that the alternating-current resistance can be suppressed. In addition, since the first coil portion 40 includes the edgewise coil 10 configured with a rectangular wire having a large surface area, it is possible to achieve a resonant coil that has an excellent quality factor using surface effect.

That is, in the case of the first coil portion 40 according to the exemplary embodiment, while inductance is reduced, the capacitance can be largely reduced, and hence, it is possible to obtain a sufficient quality factor. In addition, the edgewise coil 10 having a favorable heat dissipation property can be obtained.

Below, the configuration of the first coil portion 40 will be described in detail.

Figure 3:
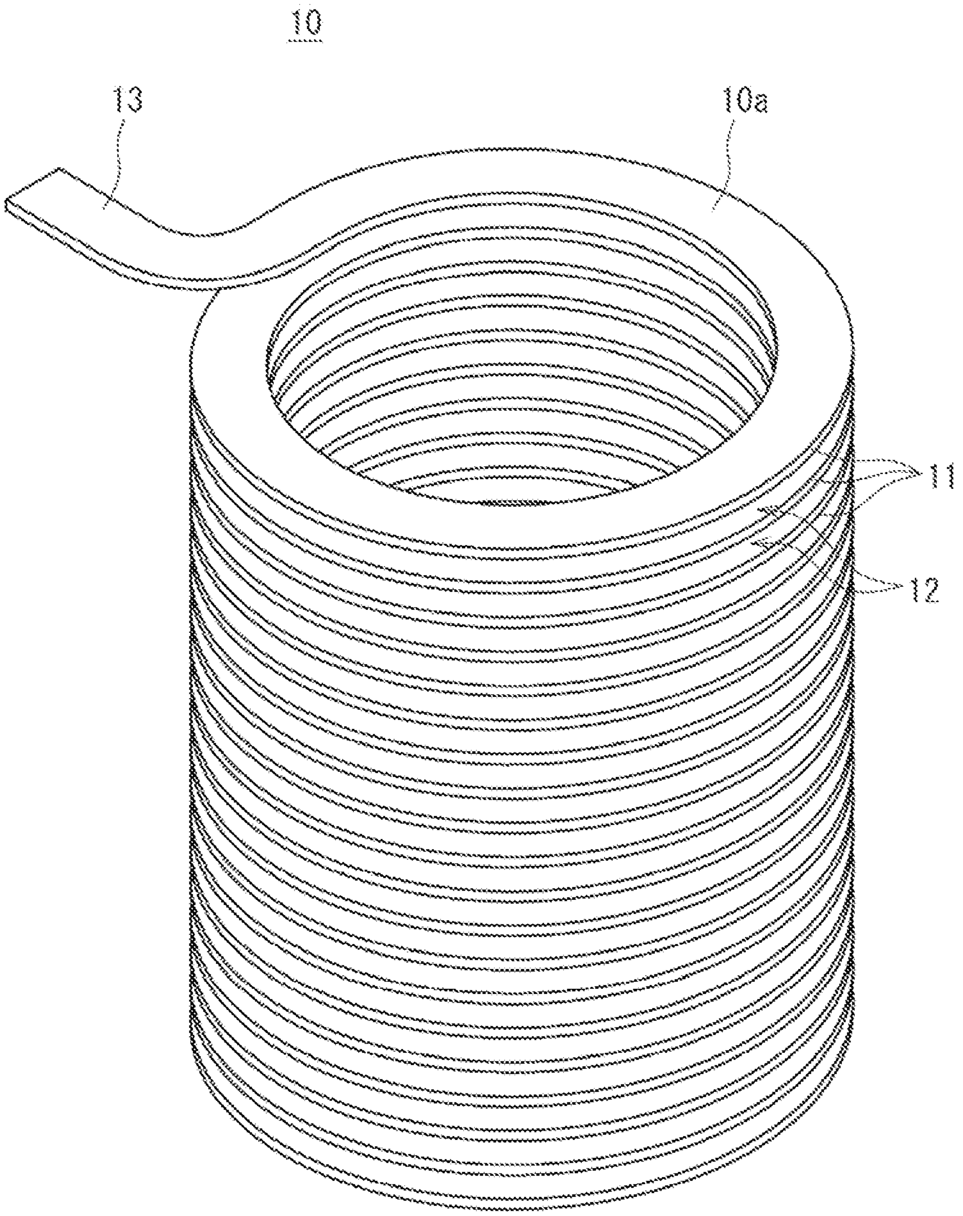
FIG. 3 is a perspective view illustrating a coil that a coil portion (first coil portion) according to the first exemplary embodiment includes.

As illustrated in FIG. 3, the edgewise coil 10 is formed by spirally winding a metal wire 10*a*, which is a rectangular wire, and has plural winding portions 11. The winding portions 11 each have a winding diameter equivalent to each other.

Figure 7:
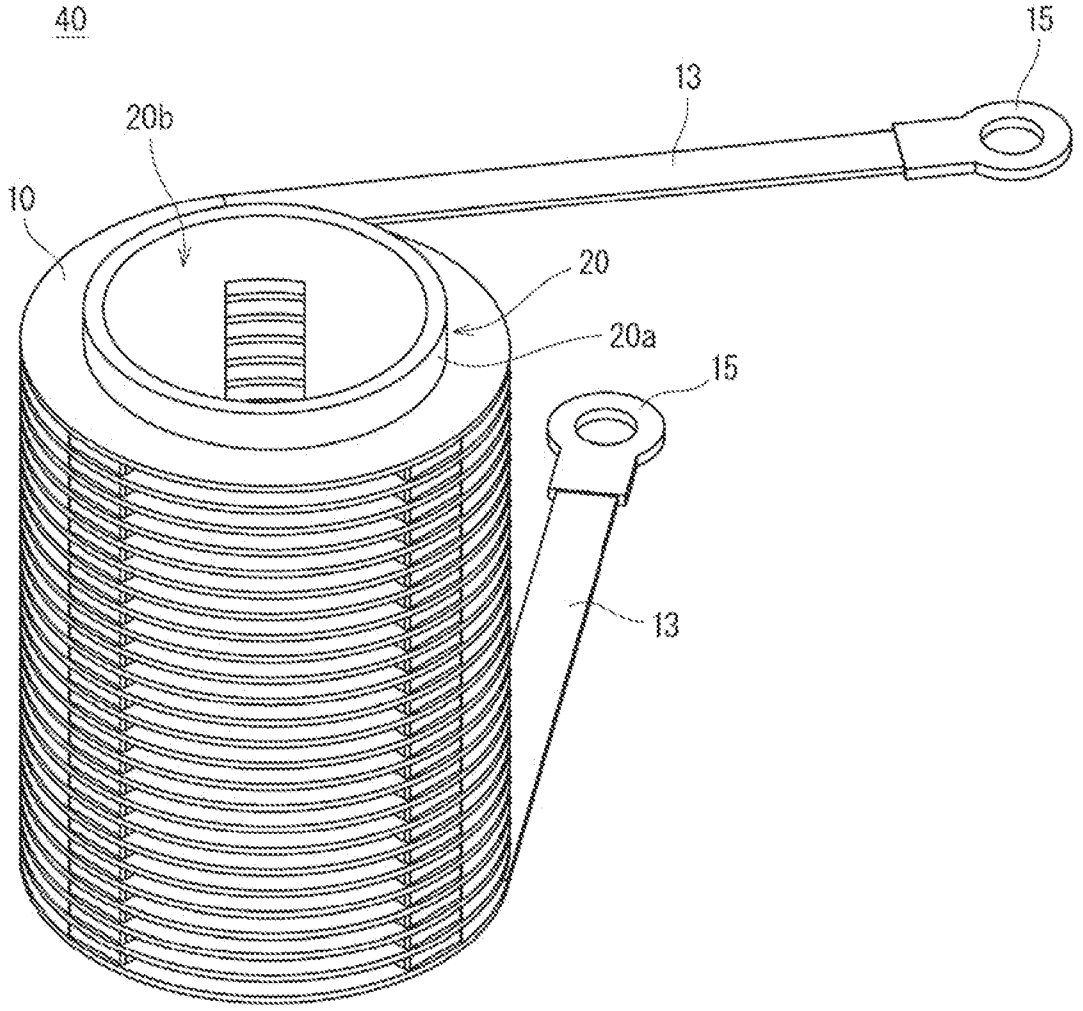
FIG. 7 is a perspective view illustrating the coil portion according to the first exemplary embodiment.

The edgewise coil 10 has an outwardly extending piece 13 at both ends thereof. The outwardly extending piece 13 at each of both ends of the edgewise coil 10 is provided with a terminal portion 15 for external connection as illustrated in FIG. 7.

The edgewise coil 10 may be configured such that, before the edgewise coil 10 is would around the bobbin 20, adjacent winding portions 11 are in contact with each other (for example, the edgewise coil 10 may be tightly wound in a manner such that no space 12 exists between adjacent winding portions 11).

Figure 4:
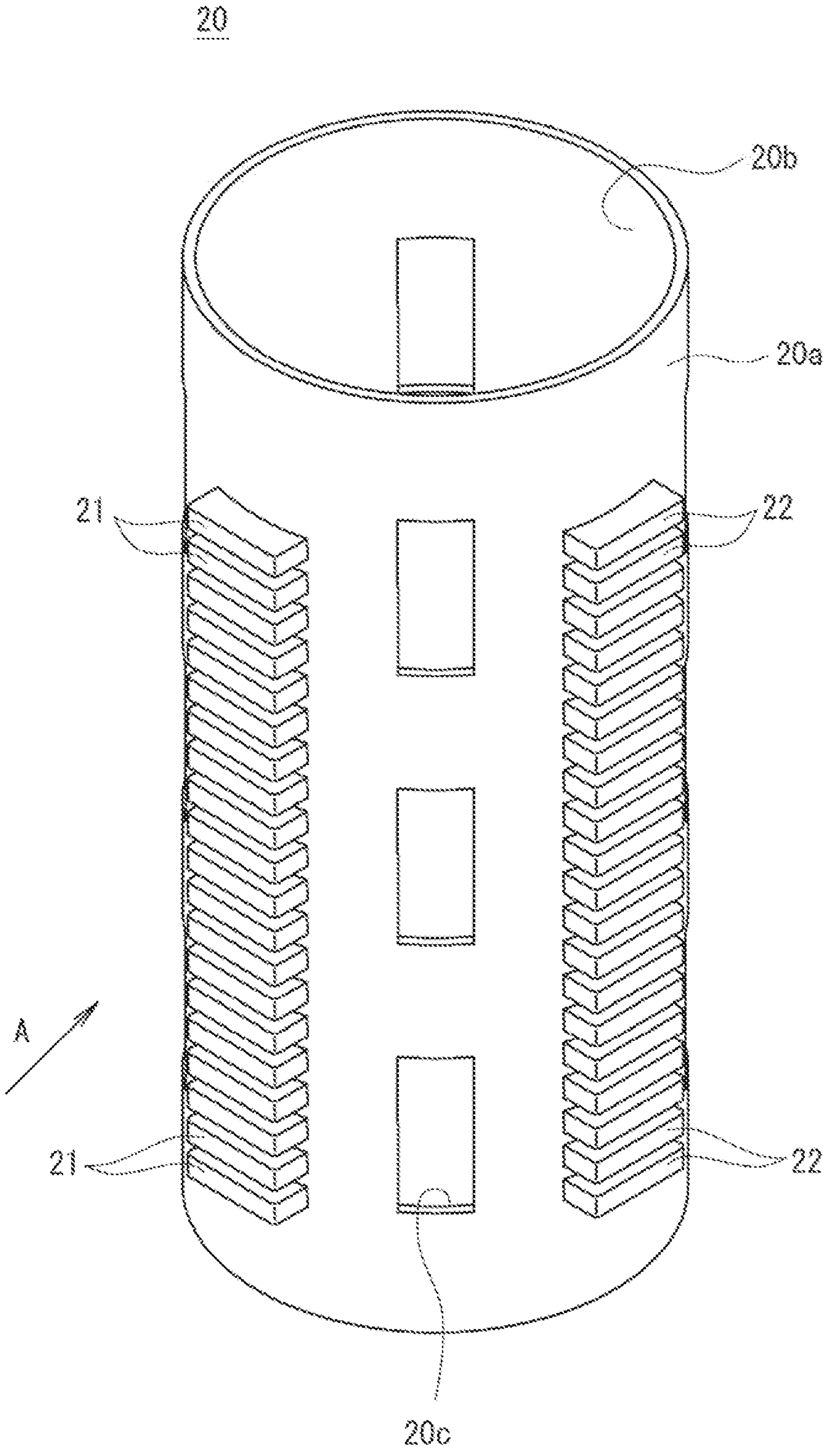
FIG. 4 is a perspective view illustrating a bobbin that the coil portion according to the first exemplary embodiment includes.
Figure 5:
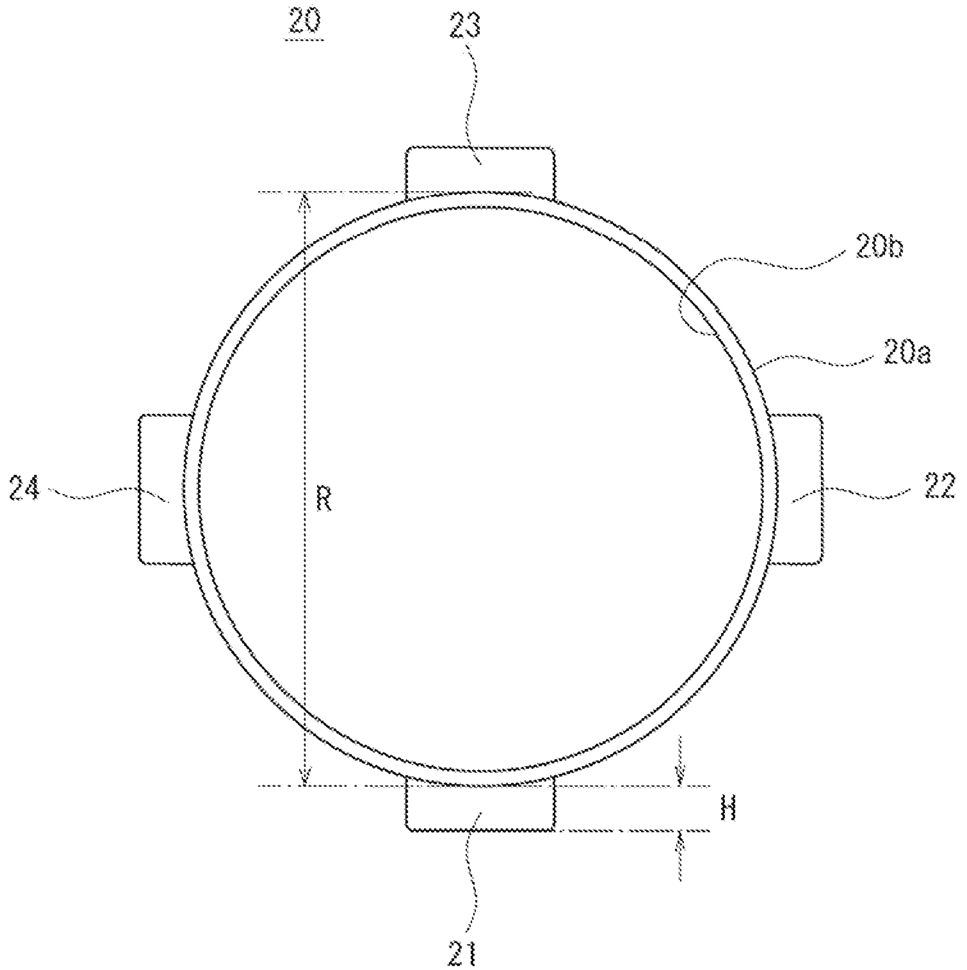
FIG. 5 is a plan view illustrating the bobbin that the coil portion according to the first exemplary embodiment includes.
Figure 6:
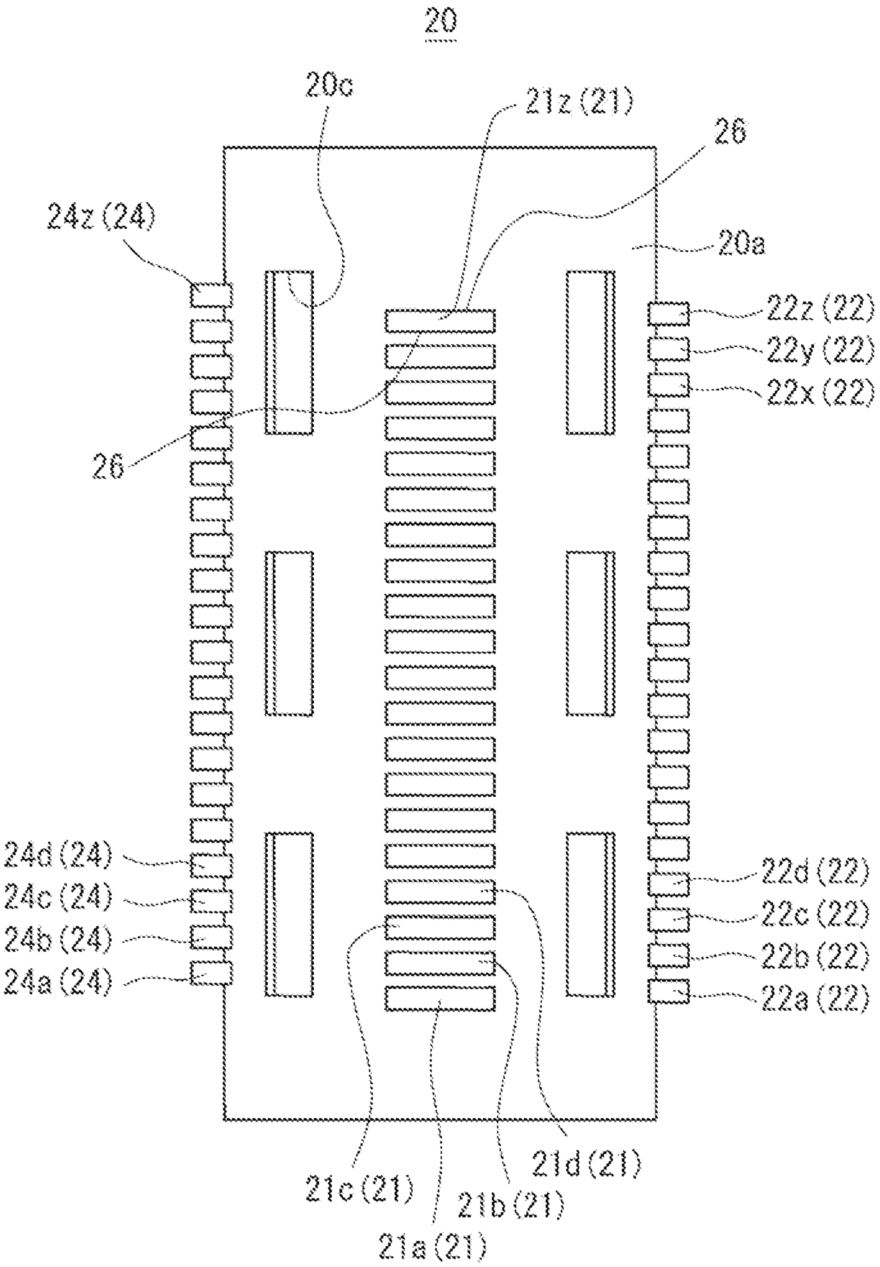
FIG. 6 is an elevation view illustrating the bobbin that the coil portion according to the first exemplary embodiment includes, showing the shape of the bobbin as viewed in the direction of the arrow A in FIG. 4.

As illustrated in FIG. 4, FIG. 5, or FIG. 6, the bobbin 20 includes a tubular bobbin body 20*a*, and a plurality of position-limiting protruding portions arranged in a plurality of portions on the outer peripheral surface of the bobbin body 20*a*.

In the case of this exemplary embodiment, the position-limiting protruding portions are arranged in a plurality of portions in the circumferential direction of the bobbin body 20*a* (in a direction around the axial center of the bobbin body 20*a*).

In addition, a plurality of the position-limiting protruding portions are arranged alongside each other along the axial direction of the bobbin body 20*a* at each of the plurality of portions in the circumferential direction of the bobbin body 20*a*.

More specifically, on the outer peripheral surface of the bobbin body 20*a*, the plurality of position-limiting protruding portions 21, the plurality of position-limiting protruding portions 22, the plurality of position-limiting protruding portions 23, and the plurality of position-limiting protruding portions 24 are arranged as illustrated in FIG. 5.

The plurality of position-limiting protruding portions 21 are arranged alongside each other along the axial direction of the bobbin body 20*a* at one portion in the circumferential direction of the bobbin body 20*a* as illustrated in FIG. 4.

In a portion positionally shifted by 90 degrees in the circumferential direction of the bobbin body 20*a* from the portion where the plurality of position-limiting protruding portions 21 are arranged, the plurality of position-limiting protruding portions 22 are arranged alongside each other along the axial direction of the bobbin body 20*a*.

In a portion positionally shifted by 180 degrees in the circumferential direction of the bobbin body 20*a* from the portion where the plurality of position-limiting protruding portions 21 are arranged, the plurality of position-limiting protruding portions 23 are arranged alongside each other along the axial direction of the bobbin body 20*a*.

In a portion positionally shifted by 180 degrees in the circumferential direction of the bobbin body 20*a* from the portion where the plurality of position-limiting protruding portions 22 are arranged, the plurality of position-limiting protruding portions 24 are arranged alongside each other along the axial direction of the bobbin body 20*a*.

In this way, a plurality of position-limiting protruding portions are arranged at individual positions equiangularly spaced apart in the circumferential direction of the bobbin body 20*a*.

The number of the position-limiting protruding portions 21, the number of the position-limiting protruding portions 22, the number of the position-limiting protruding portions 23, and the number of the position-limiting protruding portions 24 are, for example, equal to each other.

The bobbin 20 includes a position-limiting protruding portion 21*a*, a position-limiting protruding portion 21*b*, a position-limiting protruding portion 21*c*, and a position-limiting protruding portion 21*d* in the order they appear from the bottom in FIG. 6, each of which serves as the position-limiting protruding portion 21.

Figure 8:
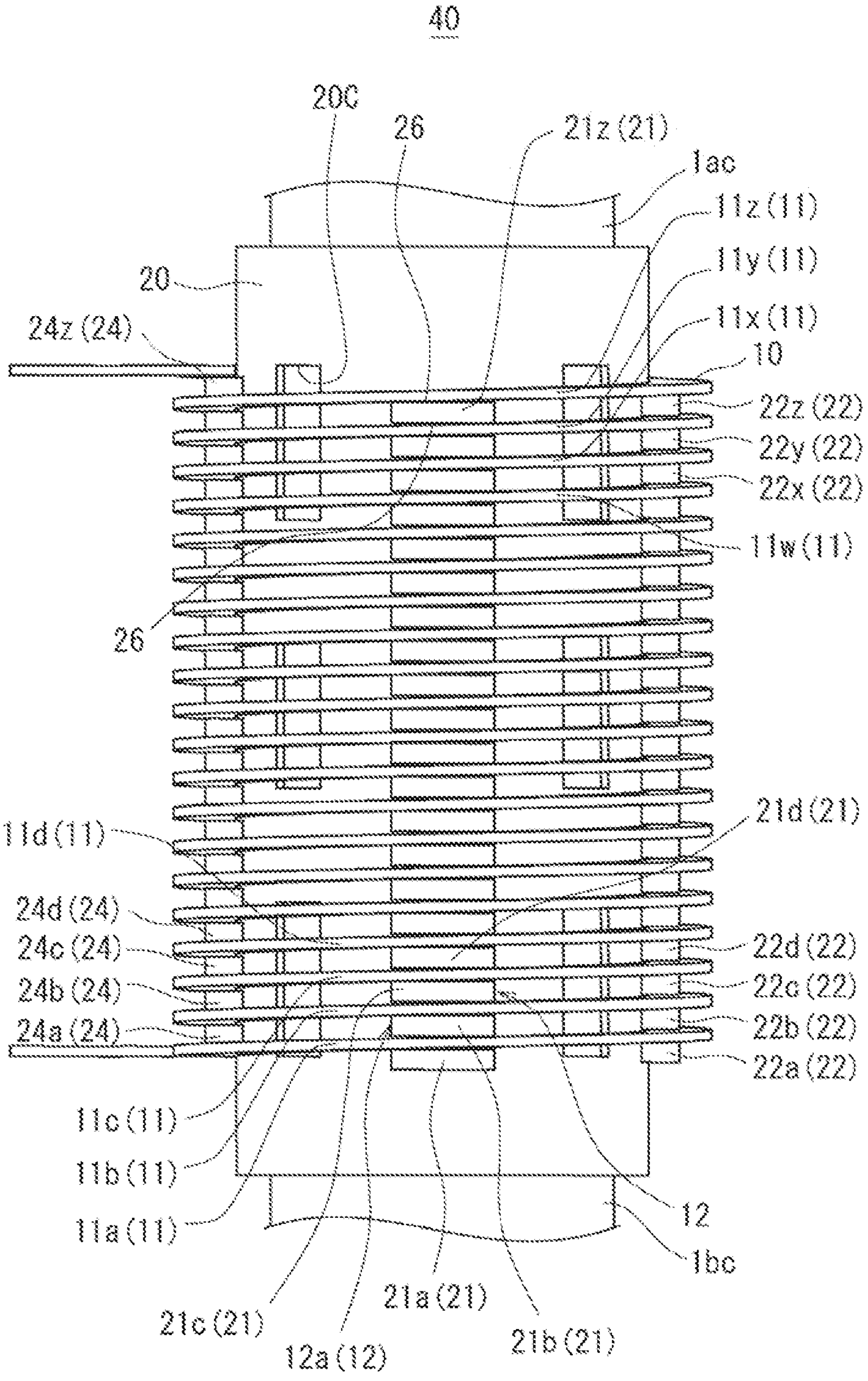
FIG. 8 is an elevation view illustrating the coil portion according to the first exemplary embodiment.

Similarly, the bobbin 20 includes a position-limiting protruding portion 22*a*, a position-limiting protruding portion 22*b*, a position-limiting protruding portion 22*c*, and a position-limiting protruding portion 22*d* in the order they appear from the bottom in FIG. 8, each of which serves as the position-limiting protruding portion 22.

Similarly, the bobbin 20 includes a position-limiting protruding portion 23*a* (not illustrated), a position-limiting protruding portion 23*b* (not illustrated), a position-limiting protruding portion 23*c* (not illustrated), and a position-limiting protruding portion 23*d* (not illustrated) in the order from bottom to top in FIG. 8, each of which serves as the position-limiting protruding portion 23. Here, the reference characters 23*a*, 23*b*, 23*c*, and 23*d* are reference characters used for convenience sake and not illustrated in the drawings.

Similarly, the bobbin 20 includes a position-limiting protruding portion 24*a*, a position-limiting protruding portion 24*b*, a position-limiting protruding portion 24*c*, and a position-limiting protruding portion 24*d* in the order they appear from the bottom in FIG. 8, each of which serves as the position-limiting protruding portion 24.

In addition, the bobbin 20 includes a position-limiting protruding portion 21*z* serving as the position-limiting protruding portion 21 and located at the uppermost position in FIG. 8.

Furthermore, the bobbin 20 includes a position-limiting protruding portion 22*z*, a position-limiting protruding portion 22*y*, and a position-limiting protruding portion 22*x* in the order they appear from the top in FIG. 8, each of which serves as the position-limiting protruding portion 22.

Similarly, the bobbin 20 includes a position-limiting protruding portion 23*z* (not illustrated) serving as the position-limiting protruding portion 23 and located at the uppermost position in FIG. 8. Here, the reference character 23*z* is a reference character used for convenience sake and not illustrated in the drawings.

Similarly, the bobbin 20 includes a position-limiting protruding portion 24*z* serving as the position-limiting protruding portion 24 and located at the uppermost position in FIG. 8.

In FIG. 6, the position-limiting protruding portion 22*a* is disposed at a position higher than the position-limiting protruding portion 21*a*; the position-limiting protruding portion 23*a* (not illustrated) is disposed at a position higher than the position-limiting protruding portion 22*a*; and the position-limiting protruding portion 21*b* is disposed at a position higher than the position-limiting protruding portion 23*a*.

Here, in the axial direction of the bobbin body 20*a*, the distance between the position-limiting protruding portion 21*a* and the position-limiting protruding portion 22*a*, the distance between the position-limiting protruding portion 22*a* and the position-limiting protruding portion 23*a*, the distance between the position-limiting protruding portion 23*a* and the position-limiting protruding portion 24*a*, and the distance between the position-limiting protruding portion 24*a* and the position-limiting protruding portion 21*b* are, for example, one quarter of the distance between the position-limiting protruding portion 21*a* and the position-limiting protruding portion 21*b*.

In addition, the position-limiting protruding portions 21 are each arranged at equal intervals in the axial direction of the bobbin body 20*a*.

Similarly, the position-limiting protruding portions 22 are each arranged at equal intervals in the axial direction of the bobbin body 20*a*.

Similarly, the position-limiting protruding portions 23 are each arranged at equal intervals in the axial direction of the bobbin body 20*a*.

Similarly, the position-limiting protruding portions 24 are each arranged at equal intervals in the axial direction of the bobbin body 20*a*.

Thus, the position-limiting protruding portions of the bobbin 20 are arranged alongside each other along the spirally shaped path in the following order: the position-limiting protruding portion 21*a*, the position-limiting protruding portion 22*a*, the position-limiting protruding portion 23*a*, the position-limiting protruding portion 24*a*, the position-limiting protruding portion 21*b*, the position-limiting protruding portion 22*b*, the position-limiting protruding portion 23*b*, the position-limiting protruding portion 24*b*, and the position-limiting protruding portion 21*c*, . . . .

As described above, the plurality of position-limiting protruding portions of the bobbin 20 are arranged along the spirally shaped path.

In the case of this exemplary embodiment, each of the position-limiting protruding portions is a rib elongated in the circumferential direction of the bobbin body 20*a*. That is, the position-limiting protruding portions each have a shape in which the size of each of the position-limiting protruding portions in the circumferential direction of the bobbin body 20*a* is larger than the size of each of the position-limiting protruding portions in the axial direction of the bobbin body 20*a*.

More specifically, the position-limiting protruding portions each have a pair of orthogonal surfaces 26 orthogonal to the axial direction of the bobbin body 20*a*. That is, in FIG. 6, the surface on the bottom side of and the surface on the top side of each of the position-limiting protruding portions each serve as the orthogonal surface 26 (in FIG. 6, the reference character of the orthogonal surface 26 is attached only to the position-limiting protruding portion 21*z*).

As described above, the plurality of position-limiting protruding portions each have the orthogonal surfaces 26, each of which is orthogonal to the axial direction of the bobbin body 20*a*. The orthogonal surface 26 is formed into a flat plane shape.

The shape and the size of each of the position-limiting protruding portions are set, for example, so as to be equivalent to each other.

In the bobbin body 20*a*, for example, one or a plurality of openings 20*c* penetrating the inside and the outside of the bobbin body 20*a* are formed. That is, a hollow portion 20*b*, which is the inside space of the bobbin body 20*a*, and the external space of the bobbin body 20*a* are communicated with each other through each of the openings 20*c*.

For example, in the circumferential direction of the bobbin body 20*a*, the openings 20*c* are arranged between the line of the plurality of position-limiting protruding portions 21 and the line of the plurality of position-limiting protruding portions 22, between the line of the plurality of position-limiting protruding portions 22 and the line of the plurality of position-limiting protruding portions 23, between the line of the plurality of position-limiting protruding portions 23 and the line of the plurality of position-limiting protruding portions 24, and between the line of the plurality of position-limiting protruding portions 24 and the line of the plurality of position-limiting protruding portions 21.

For example, the entire bobbin 20 including the bobbin body 20*a* and the plurality of position-limiting protruding portions (the plurality of position-limiting protruding portions 21, 22, 23, and 24) is formed integrally using resin or other insulating, non-magnetic material.

In this exemplary embodiment, description is made of an example in which the plurality of position-limiting protruding portions are arranged in each of four portions located in the circumferential direction of the bobbin body 20*a*. However, the present invention is not limited to this example. It may be possible that the plurality of position-limiting protruding portions are arranged in each of two or three portions in the circumferential direction of the bobbin body 20*a*. Alternatively, it may be possible that the plurality of position-limiting protruding portions are arranged in each of five or more portions in the circumferential direction of the bobbin body 20*a*.

Furthermore, the present invention is not limited to the example in which the position-limiting protruding portions are arranged in each of the plurality of portions in the circumferential direction of the bobbin body 20*a*. It may be possible to employ a configuration in which the plurality of position-limiting protruding portions are arranged in only one portion in the circumferential direction of the bobbin body 20*a*.

In addition, the present invention is not limited to the example in which the plurality of position-limiting protruding portions are arranged alongside each other along the axial direction of the bobbin body 20*a* in each of plurality of portions located in the circumferential direction of the bobbin body 20*a*. For example, it may be possible to employ a configuration in which one position-limiting protruding portion is disposed in each of plurality of portions located in the circumferential direction of the bobbin body 20*a*.

Moreover, the present invention is not limited to the example in which the plurality of position-limiting protruding portions are arranged on the outer peripheral surface of the bobbin body 20*a*. It may be possible to employ a configuration in which one spirally shaped position-limiting protruding portion (rib) is formed on the outer peripheral surface of the bobbin body 20*a*.

Here, in FIG. 5, H represents the projection length (the size of height of the position-limiting protruding portion) of each of the position-limiting protruding portions extending outward in the radial direction of the bobbin body 20*a* from the outer peripheral surface of the bobbin body 20*a*, and R represents the outer diameter of the bobbin body 20*a*. The inner diameter of the edgewise coil 10 is larger than the outer diameter R of the bobbin body 20*a*, and preferably, is less than (R+2H). In addition, it may be possible to set the inner diameter of the edgewise coil 10 to be less than (R+H). By setting the inner diameter of the edgewise coil 10 so as to be less than (R+2H), it is possible to cause the winding portions 11 of the edgewise coil 10 to more reliably engage with the position-limiting protruding portions.

As illustrated in FIG. 7, the first coil portion 40 is configured by winding the edgewise coil 10 around the bobbin body 20*a*. In addition, as illustrated in FIG. 8, the magnetic leg 1*ac* of an upper E core 1*a* and the magnetic leg 1*bc* of the lower E core 1*b*, each of which will be described later, are caused to pass through the first coil portion 40, which form the transformer 1.

As illustrated in FIG. 8, each of the winding portions 11 of the edgewise coil 10 is disposed between position-limiting protruding portions adjacent to each other in the axial direction of the bobbin body 20*a*.

Here, the edgewise coil 10 includes the winding portion 11*a*, a winding portion 11*b*, a winding portion 11*c*, and a winding portion 11*d* in the order they appear from the bottom in FIG. 8.

Furthermore, the edgewise coil 10 includes the winding portion 11*z*, a winding portion 11*y*, a winding portion 11*x*, and a winding portion 11*w* in the order they appear from the top in FIG. 8.

Of these winding portions, the winding portion 11*a* passes through, for example, between the position-limiting protruding portion 21*a* and the position-limiting protruding portion 21*b*, between the position-limiting protruding portion 22*a* and the position-limiting protruding portion 22*b*, and between the position-limiting protruding portion 23*a* (not illustrated) and the position-limiting protruding portion 23*b* (not illustrated), and then, reaches a portion between the position-limiting protruding portion 24*a* and the position-limiting protruding portion 24*b*.

Similarly, the winding portion 11*b* passes through between the position-limiting protruding portion 21*b* and the position-limiting protruding portion 21*c*, between the position-limiting protruding portion 22*b* and the position-limiting protruding portion 22*c*, and between the position-limiting protruding portion 23*b* (not illustrated) and the position-limiting protruding portion 23*c* (not illustrated), and then, reaches a portion between the position-limiting protruding portion 24*b* and the position-limiting protruding portion 24*c*.

Similarly, the winding portion 11*c* passes through between the position-limiting protruding portion 21*c* and the position-limiting protruding portion 21*d*, between the position-limiting protruding portion 22*c* and the position-limiting protruding portion 22*d*, and between the position-limiting protruding portion 23*c* (not illustrated) and the position-limiting protruding portion 23*d* (not illustrated), and then, reaches a portion between the position-limiting protruding portion 24*c* and the position-limiting protruding portion 24*d*.

Other winding portions 11 of the edgewise coil 10 similarly pass sequentially through between position-limiting protruding portions adjacent to each other in the axial direction of the bobbin 20.

Thus, the path of the wire 10*a* forming the edgewise coil 10 is limited to the spirally shaped path by the plurality of position-limiting protruding portions of the bobbin 20.

In addition, a space 12 exists between winding portions 11 adjacent to each other edgewise coil 10. In other words, the edgewise coil 10 is in a state of space winding (in a state of pitch winding).

Here, more specifically, for example, as illustrated in FIG. 9, the winding portion 11*a* of the edgewise coil 10 is in pressure contact with the position-limiting protruding portion 22*b* toward the top side in FIG. 9 (in other words, toward the position-limiting protruding portion 22*z*). On the other hand, the winding portion 11*z* of the edgewise coil 10 is in pressure contact with the position-limiting protruding portion 22*z* toward the bottom side in FIG. 9 (in other words, toward the position-limiting protruding portion 22*b*).

In addition, the winding portion 11*a* of the edgewise coil 10 is in pressure contact with the position-limiting protruding portion 21*b* toward the position-limiting protruding portion 21*z*, although no detailed illustration is given. On the other hand, the winding portion 11*z* of the edgewise coil 10 is in pressure contact with the position-limiting protruding portion 21*z* toward the position-limiting protruding portion 21*b*.

Furthermore, although no illustration is given, the winding portion 11*a* of the edgewise coil 10 is in pressure contact with the position-limiting protruding portion 23*b* toward the position-limiting protruding portion 23*z*. On the other hand, the winding portion 11*z* of the edgewise coil 10 is in pressure contact with the position-limiting protruding portion 23*z* toward the position-limiting protruding portion 23*b*.

Moreover, although no detailed illustration is given, the winding portion 11*a* of the edgewise coil 10 is in pressure contact with the position-limiting protruding portion 24*b* toward the position-limiting protruding portion 24*z*. On the other hand, the winding portion 11*z* of the edgewise coil 10 is in pressure contact with the position-limiting protruding portion 24*z* toward the position-limiting protruding portion 24*b*.

As described above, the plurality of position-limiting protruding portions include the first position-limiting protruding portion (for example, the position-limiting protruding portion 21*b*, 22*b*, 23*b*, 24*b*) and the second position-limiting protruding portion (the position-limiting protruding portion 21*z*, 22*z*, 23*z*, 24*z*) that are disposed at positions different from each other in the axial direction of the bobbin body 20*a*. In addition, the edgewise coil 10 includes: the first winding portion (for example, the winding portion 11*a*) that is in pressure contact with the first position-limiting protruding portion toward the second position-limiting protruding portion; and the second winding portion (for example, the winding portion 11*z*) that is in pressure contact with the second position-limiting protruding portion toward the first position-limiting protruding portion.

More specifically, the first winding portion (for example, the winding portion 11*a*) is in pressure contact with the orthogonal surface 26 (in particular, the surface on the bottom side of the first position-limiting protruding portion in FIGS. 8 and 9) of the first position-limiting protruding portion (for example, the position-limiting protruding portion 21*b*, 22*b*, 23*b*, 24*b*). In addition, the second winding portion (for example, the winding portion 11*z*) is in pressure contact with the orthogonal surface 26 (in particular, the surface on the top side of the first position-limiting protruding portion in FIGS. 8 and 9) of the second position-limiting protruding portion.

Thus, the first winding portion and the second winding portion are in a state of being substantially in surface contact with the first position-limiting protruding portion and the second position-limiting protruding portion, respectively.

This configuration more reliably reduces the positional displacement of the first winding portion and the second winding portion with respect to the first position-limiting protruding portion and the second position-limiting protruding portion, respectively.

Furthermore, the winding portions 11 (for example, the winding portion 11*b*, 11*c*, 11*x*, 11*y* illustrated in FIG. 9 and the like) other than the first winding portion (for example, the winding portion 11*a*) or the second winding portion (for example, the winding portion 11*z*) are disposed, for example, between position-limiting protruding portions 21 adjacent to each other in the axial direction of the bobbin body 20*a*, between position-limiting protruding portions 22 adjacent to each other in the axial direction of the bobbin body 20*a*, between position-limiting protruding portions 23 adjacent to each other in the axial direction of the bobbin body 20*a*, and between position-limiting protruding portions 24 adjacent to each other in the axial direction of the bobbin body 20*a*.

With this configuration, winding portions 11 from the first winding portion (for example, the winding portion 11*a*) to the second winding portion (for example, the winding portion 11*z*) are arranged equally (substantially at equal intervals) in the axial direction of the bobbin body 20*a*.

However, it may be possible that part of the winding portions 11 other than the first winding portion (for example, the winding portion 11*a*) and the second winding portion (for example, the winding portion 11*z*) is in contact with any of position-limiting protruding portions.

In the example illustrated in FIGS. 8 and 9, surplus position-limiting protruding portions 21, 22, and 23 (the position-limiting protruding portions 21*a*, 22*a*, and 23*a* (not illustrated)) exist on one side (the bottom side) of the bobbin body 20*a* in the axial direction of the bobbin body 20*a*. However, these surplus position-limiting protruding portions may not exist.

In addition, surplus position-limiting protruding portions may exist on both sides of the bobbin body 20*a* in the axial direction of the bobbin body 20*a*.

Description has been made with reference to FIG. 9 of an example in which the winding portions 11 (the winding portions 11*a* and 11*z*) on both ends of the edgewise coil 10 are each in pressure contact with the position-limiting protruding portion. However, the present invention is not limited to this configuration. It may be possible that a surplus winding portion 11 exists on both sides or one side of the edgewise coil 10, and the winding portion 11 that is not the end portion of the edgewise coil 10 is in pressure contact with a position-limiting protruding portion.

Figure 10:
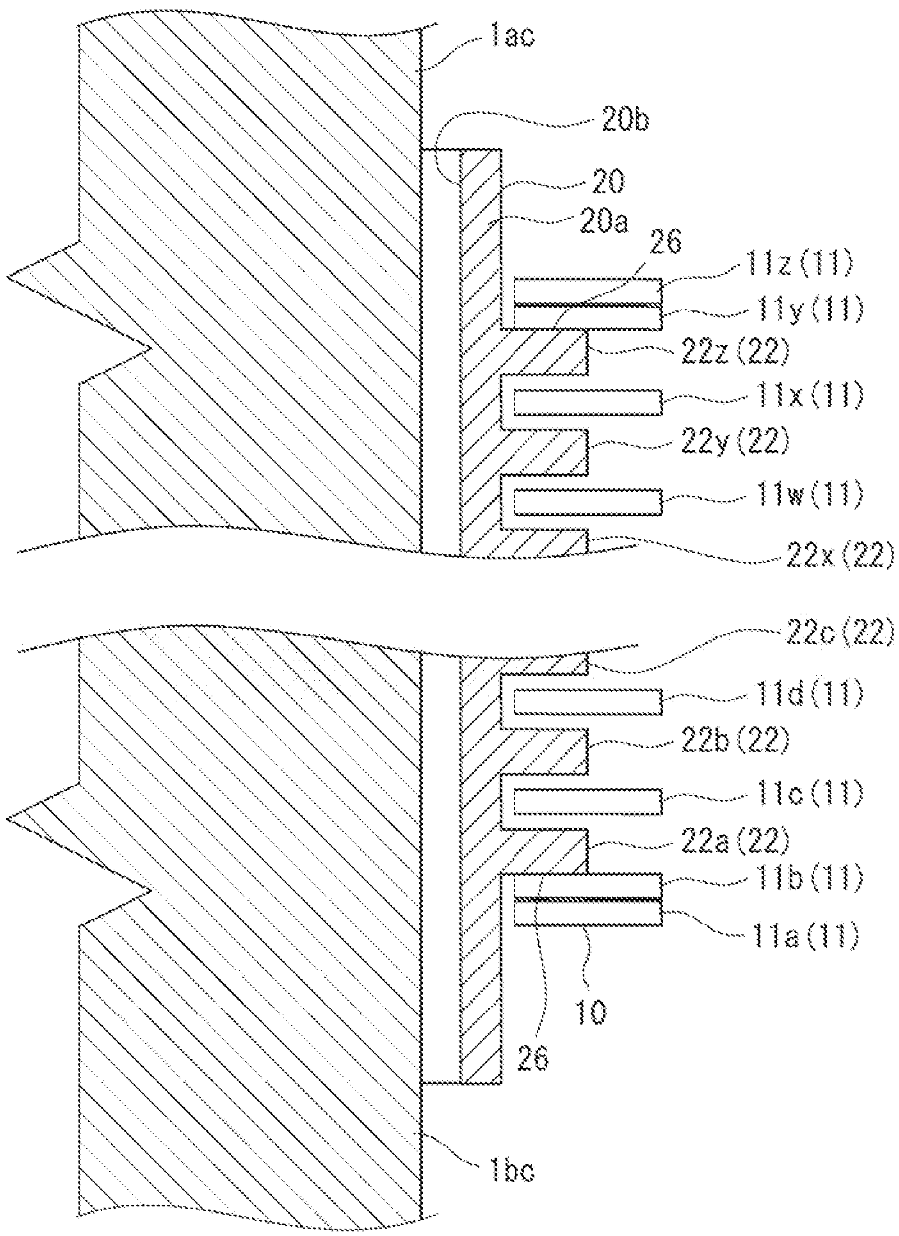
FIG. 10 is a front sectional view illustrating a coil portion according to a modification example of the first exemplary embodiment.

That is, for example, as illustrated in FIG. 10, it may be possible that the winding portion 11*b* is in pressure contact with the position-limiting protruding portion 22*a* toward the position-limiting protruding portion 22*z*, and the winding portion 11*y* is in pressure contact with the position-limiting protruding portion 22*z* toward the position-limiting protruding portion 22*a*. In this case, the winding portion 11*b* serves as the first winding portion; the winding portion 11*y* serves as the second winding portion; the position-limiting protruding portion 22*a* serves as the first position-limiting protruding portion; and the position-limiting protruding portion 22*z* serves as the second position-limiting protruding portion.

In this case, a surplus winding portion 11 may be tightly wound in a manner such that the surplus winding portion 11 is in close contact with an adjacent winding portion 11. At least, in the axial direction of the bobbin body 20*a*, the space between a surplus winding portion 11 and a winding portion 11 adjacent to this surplus winding portion 11 is narrower than each of the spaces between winding portions adjacent to each other of the winding portions 11 from the first winding portion and the second winding portion.

Configuration of Second Coil Portion

Figure 11:
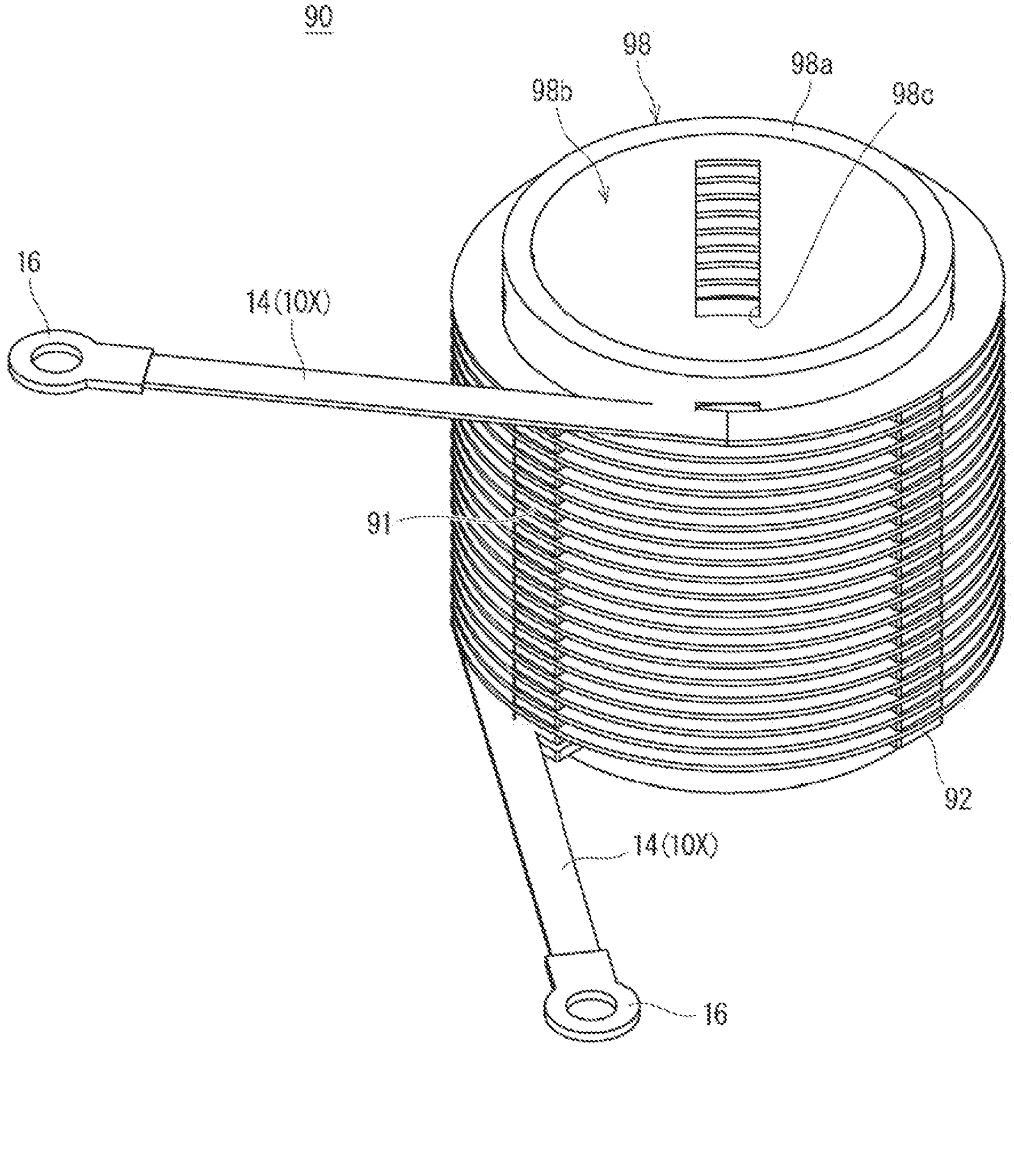
FIG. 11 is a perspective view illustrating a second coil portion according to the first exemplary embodiment.
Figure 12:
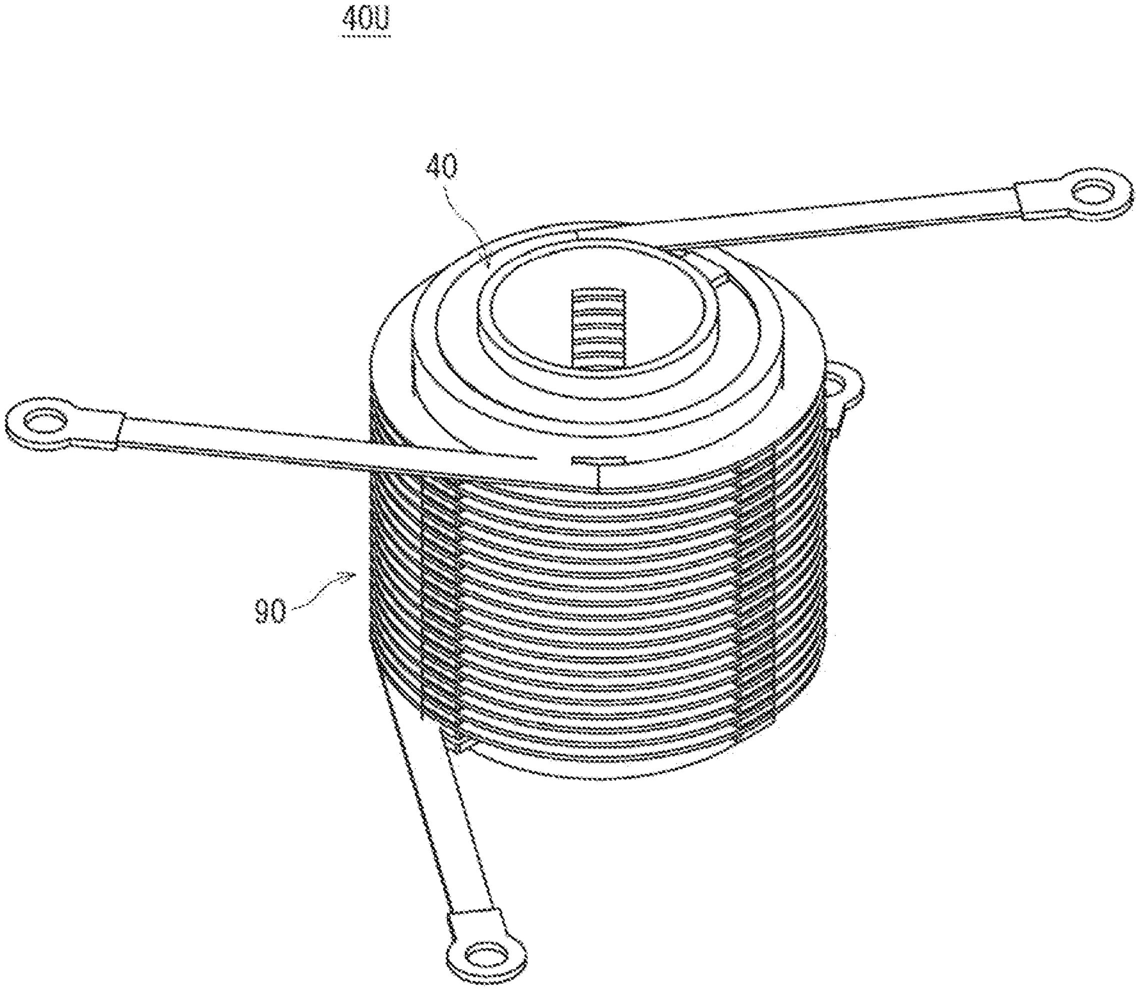
FIG. 12 is a perspective view illustrating a state where the second coil portion is attached at the outer periphery of the first coil portion according to the first exemplary embodiment.

Next, the configuration of the second coil portion 90 will be described with reference to FIGS. 11 and 12. As illustrated in FIG. 11, the second coil portion 90 includes a bobbin 98 and an edgewise coil 10X wound around the bobbin 98 as with the first coil portion 40.

The bobbin 98 of the second coil portion 90 includes a tubular bobbin body 98*a*, and a plurality of position-limiting protruding portions, for example, a plurality of position-limiting protruding portions 91, 92, 93 (not illustrated), 94 arranged in a plurality of portions on an outer peripheral surface of the bobbin body 98*a*, as with the bobbin 20 of the first coil portion 40. The plurality of position-limiting protruding portions 91, 92, 93 (not illustrated), 94 are provided to limit the position of the winding portion 11 of the edgewise coil 10X in the axial direction of the bobbin body 98*a*, and has a configuration similar to that of the plurality of position-limiting protruding portions 21, 22, 23, 24 of the first coil portion 40. Here, the reference character 93 is a reference character provided for the convenience purpose, and is not illustrated in any of the drawings.

Furthermore, a hollow portion 98*b*, which is the inside space of the bobbin body 98*a*, is formed so as to be slightly larger in the radially outward direction than the first coil portion 40 (bobbin 20). Thus, in a state where the bobbin 98 is attached radially outside of the bobbin 20, the bobbin 98 is disposed so as to be closely contacted in the radial direction. More specifically, the bobbin 20 and the bobbin 98 are arranged in a manner such that the inside surface of the bobbin body 98*a* of the bobbin 98 is close to corner portions of the position-limiting protruding portions 21, 22, 23, and 24 of the bobbin 20.

In the bobbin body 98*a*, for example, one or a plurality of openings 98*c* penetrating the inside and the outside of the bobbin body 98*a* are formed, as with the openings 20*c* of the bobbin body 20*a*. That is, the hollow portion 98*b* of the bobbin body 98*a* and the external space of the bobbin body 98*a* are communicated with each other through each of the openings 98*c*.

Furthermore, the bobbin body 98*a* of the second coil portion 90 is formed so as to have a thickness larger than that of the bobbin body 20*a* of the first coil portion 40. With the bobbin body 98*a* configured as described above, the edgewise coil 10 and the edgewise coil 10X are favorably insulated from each other.

The bobbin body according to the present invention is not limited to the configuration described above, provided that the edgewise coil 10 and the edgewise coil 10X are insulated from each other. For example, the bobbin body 20*a* of the first coil portion 40 and the bobbin body 98*a* of the second coil portion 90 may have the same thickness.

Furthermore, the length in the vertical direction (in the axial direction) of the bobbin body 98*a* is equal to the length in the vertical direction (in the axial direction) from the uppermost end to the lowermost end of the position-limiting protruding portions 21, 22, 23, and 24 of the first coil portion 40. As the bobbin body 98*a* is formed as described above, it is possible to enhance the insulation property between the edgewise coil 10 and the edgewise coil 10X.

The edgewise coil 10X has a configuration similar to that of the edgewise coil 10 of the first coil portion 40. More specifically, the edgewise coil 10X has an outwardly extending piece 14 at both ends thereof. In addition, the outwardly extending piece 14 at each of both ends of the edgewise coil 10X is provided with a terminal portion 16 for external connection, as illustrated in FIG. 11.

Furthermore, the edgewise coil 10X includes a first winding portion (for example, a portion corresponding to the winding portion 11*a* of the edgewise coil 10) that is in pressure contact with the first position-limiting protruding portion toward the second position-limiting protruding portion. In addition, the edgewise coil 10X further includes a second winding portion (for example, a portion corresponding to the winding portion 11*z* of the edgewise coil 10) that is in pressure contact with the second position-limiting protruding portion toward the first position-limiting protruding portion. The edgewise coil 10X is in a space winding in which individual winding portions 11 from the first winding portion to the second winding portion are spaced apart from each other in the axial direction of the bobbin body 98*a*.

As described above, since the edgewise coil 10X is in pressure contact with the bobbin body 98*a*, it is possible to prevent the edgewise coil 10X from being loosened when external force acts on the transformer 1, as with the case in which the edgewise coil 10 is in pressure contact with the bobbin body 20*a*. In addition, since the edgewise coil 10X is prevented from being loosened, it is possible to reduce the proximity effect, and prevent a reduction in inductance.

Furthermore, the number of turns of the edgewise coil 10X of the second coil portion 90 is less than that of the edgewise coil 10 of the first coil portion 40 so that the voltage generated in the second coil portion 90 is reduced with respect to voltage generated from the first coil portion 40. In addition, the spaces between turns in the axial direction are substantially the same in the edgewise coil 10 and the edgewise coil 10X. Thus, the length of the edgewise coil 10X in the axial direction thereof is shorter than that of the edgewise coil 10 in the axial direction thereof.

In the case of this exemplary embodiment, the coil of each of the first coil portion 40 and the second coil portion 90 provided in the transformer 1 is the edgewise coil 10, 10X. Thus, it is possible to obtain a resonant coil having an excellent quality factor due to skin effect, which is favorable. However, the present invention is not limited to the configuration described above. For example, it may be possible to employ a configuration in which either one of the coils constituting the transformer 1 is an edgewise coil, and the other one is a coil with litz wire. Even with such a configuration, at least one of the first coil portion 40 and the second coil portion 90 includes an edgewise coil, and hence, it is possible to reduce stray capacity and insertion loss while increasing a quality factor due to skin effect, as compared with one including litz wire.

Furthermore, the second coil portion 90 is disposed with respect to the first coil portion 40 so as to cover part of the outer periphery of the first coil portion 40 in a manner that these portions overlap in the axial direction of the central axes of these portions. Thus, as compared with a case where the second coil portion 90 is disposed on the extended line of the axial direction of the first coil portion 40, it is possible to reduce stray capacity, and it is possible to reduce the entire axial length of the first coil portion 40 and the second coil portion 90 as a whole, whereby it is possible to reduce insertion loss.

In addition, description has been made that it is preferable that the edgewise coil 10 is in pressure contact with the bobbin body 20*a*, and the edgewise coil 10X is in pressure contact with the bobbin body 98*a*. However, the present invention is not necessarily limited to this configuration. For example, it may be possible to employ a configuration in which either one of the bobbin body 20*a* and the bobbin body 98*a* is not provided with the position-limiting protruding portion 21 or the like, or the position-limiting protruding portion 91 or the like, or neither the bobbin body 20*a* nor the bobbin body 98*a* is provided with the position-limiting protruding portion 21 or the like, or the position-limiting protruding portion 91 or the like. For example, it may be possible to employ a configuration in which either one of or both of the edgewise coil 10 and the edgewise coil 10X are in space wiring, and are wound around the bobbin body 20*a* or bobbin body 98*a* in pitch winding.

The first coil portion 40 according to the exemplary embodiment is manufactured, for example, by screwing a bobbin 20 to a fixed edgewise coil 10. Similarly, the second coil portion 90 is manufactured, for example, by screwing a bobbin 98 to a fixed edgewise coil 10X.

After this, the second coil portion 90 is attached radially outside of the first coil portion 40, and then, a magnetic leg 1*ac* and a magnetic leg 1*bc* are inserted into the bobbin 20 of the first coil portion 40, as illustrated in FIG. 2. Through these processes, the first coil portion 40 and the second coil portion 90 are attached between the upper E core 1*a* and the lower E core 1*b*, serving as the constituting elements of the transformer 1.

An insulating plate 1*g*, 1*h*, serving as an insulating portion, is disposed in the vicinity of the end portion of the edgewise coil 10 of the first coil portion 40 and the end portion of the edgewise coil 10X of the second coil portion 90. More specifically, the insulating plate 1*g* is disposed between the first coil portion 40 and the yoke portion 1*aa* located on the extended line of the axial direction of the first coil portion 40 and the second coil portion 90, and between the second coil portion 90 and the yoke portion 1*aa*. In addition, the insulating plate 1*h* is disposed between the first coil portion 40 and the yoke portion 1*ba* located on the extended line of the axial direction of the first coil portion 40 and the second coil portion 90, and between the second coil portion 90 and the yoke portion 1*ba*.

The insulating plates 1*g* and 1*h* are each formed into a disk shape having a through hole at the center thereof. The magnetic leg 1*ac* of the upper E core 1*a* is caused to pass through this through hole portion at the center of the insulating plate 1*g*, so that the insulating plate 1*g* is disposed on the base end side of the magnetic leg 1*ac* and above the first coil portion 40 and the second coil portion 90. The magnetic leg 1*bc* of the lower E core 1*b* is caused to pass through the through hole portion at the center of the insulating plate 1*h*, so that the insulating plate 1*h* is disposed on the base end side of the magnetic leg 1*bc* and below the first coil portion 40 and the second coil portion 90. In other words, the insulating plates 1*g* and 1*h* are disposed so as to surround the periphery of the magnetic legs 1*ac* and 1*bc*, respectively.

The transformer 1 has the insulating plates 1*g* and 1*h* disposed therein as described above, thereby preventing the edgewise coils 10 and 10X from being brought into contact with the upper E core 1*a* and lower E core 1*b* to maintain an electrically insulating state.

Figure 13:
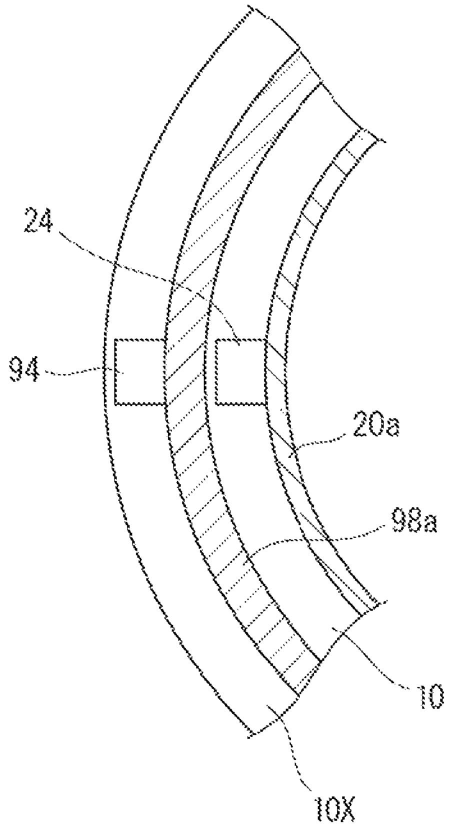
FIG. 13 is a plan view schematically illustrating one example of positional relationship between the first coil portion and the second coil portion.

The second coil portion 90 may be disposed in a manner such that the inner peripheral surface of the bobbin body 98*a* is in contact with the outer peripheral surface of the edgewise coil 10 of the first coil portion 40 as illustrated in FIG. 13. FIG. 13 is a plan view schematically illustrating one example of a positional relationship between the first coil portion 40 and the second coil portion 90.

As the bobbin body 98*a* of the second coil portion 90 is in contact with the outer peripheral surface of the edgewise coil 10 as described above, it is possible to increase the contacting area between the second coil portion 90 and the first coil portion 40.

In other words, the edgewise coil 10 sticks out radially outside further than the corners of the position-limiting protruding portion 24X of the first coil portion 40 and the corners of other not-illustrated position-limiting protruding portions. With this configuration, the corner of the position-limiting protruding portion 24 illustrated in FIG. 13 and the corners of the position-limiting protruding portions 21, 22, and 23 are not in contact with the bobbin body 98*a*, and hence, it is possible to prevent the corners of the position-limiting protruding portions 21, 22, 23, and 24 from chipping off. In addition, load resulting from the first coil portion 40 does not locally acts on the second coil portion 90, and hence, it is possible to attach the second coil portion 90 radially outside of the first coil portion 40 in a smooth manner.

Figure 14:
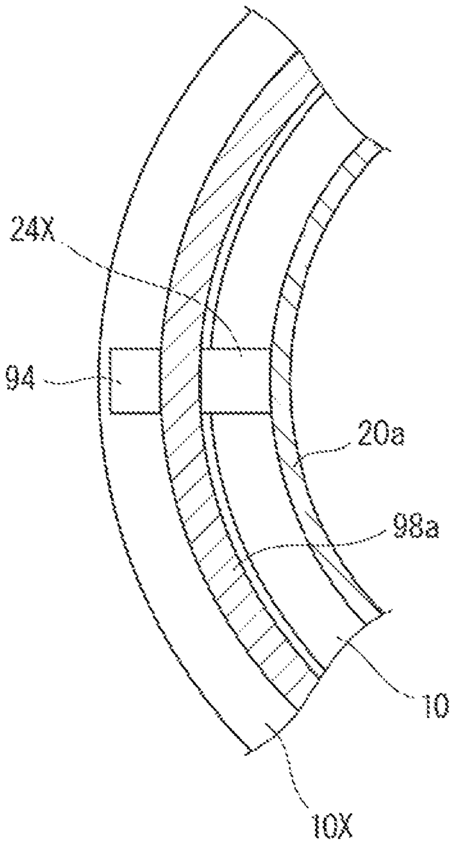
FIG. 14 is a plan view schematically illustrating another example of positional relationship between the first coil portion and the second coil portion.

Alternatively, the second coil portion 90 may be disposed in a manner such that the inner peripheral surface of the bobbin body 98*a* is in contact with the corner of the position-limiting protruding portion 24X of the first coil portion 40 as illustrated in FIG. 14 and the corners of the other not-illustrated position-limiting protruding portions. FIG. 14 is a plan view schematically illustrating another example of the positional relationship between the first coil portion 40 and the second coil portion 90.

In other words, the corner of the position-limiting protruding portion 24X of the first coil portion 40 and the corners of other not-illustrated position-limiting protruding portion stick out radially outside further than the edgewise coil 10. Thus, the bobbin body 98*a* of the second coil portion 90 is not in contact with the edgewise coil 10 of the first coil portion 40.

For example, when external force acts on the transformer 1, it is expected that the bobbin body 98*a* rocks toward and away from the axis of the first coil portion 40. Even in such a case, no load from the bobbin body 98*a* acts on the edgewise coil 10 because the bobbin body 98*a* is not in contact with the edgewise coil 10 as described above. Thus, even if external force acts on the transformer 1, it is possible to prevent a reduction in inductance of the edgewise coil 10.

EXAMPLE

Next, description will be made of evaluation results concerning an example of the transformer including the edgewise coil 10 according to this exemplary embodiment and a transformer including a coil using litz wire. The cross section of the edgewise coil 10 according to the present example was 1.2 mm wide and 6 mm high. The litz wire was composed of 20 strands with the diameter of 0.5 mm. The number of turns of the coil disposed radially inside and that of the coil disposed radially outside were set to be equal to each other.

Comparison of Static Characteristics

Static characteristics were compared using alternating current flowing at 2 MHz. In the case of the coil using the litz wire, the coil disposed radially inside showed the inductance component of 27.46 μH, the alternating-current resistance of 2.715Ω, and the quality factor of 127.0, whereas the coil disposed radially outside showed the inductance component of 31 μH, the alternating-current resistance of 4.48Ω, and the quality factor of 86.9. In addition, as for the leakage inductance, the inductance component was 4.307 μH, the alternating-current resistance was 1.95Ω, and the quality factor was 27.7.

On the other hand, in the case of the edgewise coil 10, the edgewise coil 10 disposed radially inside showed the inductance component of 23.93 μH, the alternating-current resistance of 0.99Ω, and the quality factor of 303.6, whereas the edgewise coil 10 disposed radially outside showed the inductance component of 28.51 μH, the alternating-current resistance of 1.813Ω, and the quality factor of 197.5. As for the leakage inductance, the inductance component was 4.897 μH, the alternating-current resistance was 0.518Ω, and the quality factor was 118.7.

The coils using the litz wire disposed radially inside and that disposed radially outside each showed the series resistance of 17.44 mΩ.

On the other hand, the series resistance of the edgewise coil 10 disposed radially inside was 7.62 mΩ, and the series resistance of the edgewise coil 10 disposed radially outside was 11.82 mΩ.

In the case of the transformer according to the present example, the alternating-current resistances are one third to one quarter of that of the transformer including the coil using the litz wire for both of the coil disposed radially inside and the coil disposed radially outside as well as the leakage inductance. Thus, the insertion loss in terms of a single unit of transformer can be reduced, as compared with the transformer formed from the litz wire.

Comparison of Efficiency in DC/DC Converter

Conversion efficiency in DC was compared through operations of a resonant type converter at 2 MHz.

The transmission efficiency without any transformer was 90.10%. The transmission efficiency of a transformer including litz wire was 83.02%. The transmission efficiency of a transformer including the edgewise coil 10 was 89.47%. In other words, the transformer including the edgewise coil 10 exhibited an improvement of 6% in insertion loss, as compared with the transformer including litz wire.

Method for Manufacturing Transformer

A method for manufacturing the transformer 1 according to this exemplary embodiment first includes preparing: the upper E core 1*a*; the lower E core 1*b*; the first coil portion 40 that covers the magnetic leg 1*ac* of the upper E core 1*a* and the magnetic leg 1*bc* of the lower E core 1*b*; and the second coil portion 90 disposed radially outside of the first coil portion 40. Here, as described above, the first coil portion 40 includes the bobbin 20 and the edgewise coil 10 wound around the bobbin 20, and the second coil portion 90 includes the bobbin 98 and the edgewise coil 10X wound around the bobbin 98.

In a screwing step, the bobbin 20 of the first coil portion 40 and the edgewise coil 10 of the first coil portion 40 are screwed with each other, and the bobbin 98 of the second coil portion 90 and the edgewise coil 10X of the second coil portion 90 are screwed with each other.

Furthermore, in an attaching step, the second coil portion 90 is attached so as to cover the first coil portion 40 from radially outside of the first coil portion 40. In addition, the upper E core 1*a* and the lower E core 1*b* are attached so as to sandwich the first coil portion 40 and the second coil portion 90 in the axial direction of the first coil portion 40. More specifically, the magnetic leg 1*ac* and the magnetic leg 1*bc* are inserted into the hollow portion 20*b* of the first coil portion 40 from above and below in FIG. 1.

By attaching the upper E core 1*a* and the lower E core 1*b* to the first coil portion 40 and the second coil portion 90, which include the edgewise coil 10 and the edgewise coil 10X, respectively, as described above, it is possible to provide the method for manufacturing the transformer 1 having reduced insertion loss while preventing the quality factor from reducing due to skin effect.

In particular, as described above, the edgewise coil 10 includes the winding portion 11*a* serving as the first winding portion that is in pressure contact with the position-limiting protruding portion 22*b* or the like toward the position-limiting protruding portion 22*z* or the like. In addition, the edgewise coil 10 further includes the winding portion 11*z* serving as the second winding portion that is in pressure contact with the position-limiting protruding portion 22*z* or the like toward the position-limiting protruding portion 22*b*. On the other hand, the edgewise coil 10X includes the winding portion that is in pressure contact with the position-limiting protruding portion 91 or like, as with the edgewise coil 10. In the screwing step, the edgewise coil 10 is wound around the bobbin 20 in the state of space winding in which individual winding portions 11 from the winding portion 11*a* to the winding portion 11*z* of the first coil portion 40 are spaced apart from each other in the axial direction of the bobbin body 20*a*.

Similarly, the edgewise coil 10X is wound around the bobbin 98 in the state of space winding in which individual winding portions of the second coil portion 90 are spaced apart from each other.

As described above, as the edgewise coils 10 and 10X are wound so as to be in pressure contact with the bobbin bodies 20*a* and 98*a*, respectively, it is possible to prevent the edgewise coils 10 and 10X from being loosened when external force acts on the transformer 1. Thus, the proximity effect between the edgewise coils 10 and 10X is reduced, so that it is possible to prevent a deterioration in performance of the transformer 1.

Here, when the bobbin 20 and the edgewise coil 10 are screwed with each other, the edgewise coil 10 extends in the axial direction of the bobbin body 20*a* due to drag that the winding portions 11 of the edgewise coil 10 receive from the plurality of position-limiting protruding portions. As a result, the first winding portion of the edgewise coil 10 is brought into pressure contact with the first position-limiting protruding portion toward the second position-limiting protruding portion, and the second winding portion of the edgewise coil 10 is brought into pressure contact with the second position-limiting protruding portion toward the first position-limiting protruding portion.

Similarly, when the bobbin 98 and the edgewise coil 10X are screwed with each other, the edgewise coil 10X extends in the axial direction of the bobbin body 98*a* due to drag that the winding portions of the edgewise coil 10X receive from the plurality of position-limiting protruding portions 94 and the like. As a result, the winding portions of the edgewise coil 10X are brought into pressure contact with the position-limiting protruding portions 94 and the like, as with the winding portions 11 of the edgewise coil 10.

As described above, the screwing step is performed while the edgewise coils 10 and 10X are being caused to extend in the axial direction of the bobbin bodies 20*a* and 98*a* using drag that each of the winding portions 11 of the edgewise coil 10 and each of the winding portions of the edgewise coil 10X each receive from the plurality of position-limiting protruding portions. By winding the edgewise coil 10, 10X around the bobbin body 20*a*, 98*a* in this manner, resilience force acts on the edgewise coil 10, 10X, so that the edgewise coil 10, 10X can be more stably attached to the bobbin 20, 98.

Before the edgewise coil 10 is screwed with the bobbin 20 or the edgewise coil 10X is screwed with the bobbin 98, the edgewise coil 10 or the edgewise coil 10X may be tightly wound in a manner such that adjacent winding portions are in close contact with each other.

In addition, if there are variations in spaces between winding portions of the edgewise coil 10, 10X before the edgewise coil 10, 10X is screwed with the bobbin 20, 98, the positions of the individual winding portions are limited with the plurality of position-limiting protruding portions arranged at equal intervals in the axial direction of the bobbin body 20*a*, 98*a*. Thus, these spaces between the winding portions can be equalized.

According to the first exemplary embodiment as described above, the first winding portion of the edgewise coil 10 is in pressure contact with the first position-limiting protruding portion toward the second position-limiting protruding portion. At the same time, the second winding portion of the edgewise coil 10 is in pressure contact with the second position-limiting protruding portion toward the first position-limiting protruding portion. With this configuration, it is possible to stably determine the positions of the first winding portion and the second winding portion with respect to the first position-limiting protruding portion and the second position-limiting protruding portion, respectively. Thus, it is possible to more stably maintain the position of each of the winding portions 11 of the edgewise coil 10, and it is possible to more reliably achieve the first coil portion 40 having a high quality factor.

Similarly, the winding portions of the edgewise coil 10X are in pressure contact with the position-limiting protruding portions in a similar manner. With this configuration, it is possible to stably determine the position of each of the winding portions with respective to the position-limiting protruding portions. Thus, it is possible to more stably maintain the position of each of the winding portions of the edgewise coil 10X, and it is possible to more reliably achieve the second coil portion 90 having a high quality factor.

Second Exemplary Embodiment

The transformer 1 according to the first exemplary embodiment includes the upper E core 1*a* and the lower E core 1*b* attached so as to sandwich the coil unit 40U from above and below. According to the present invention, it is only necessary that the second coil portion 90 is disposed radially outside of the first coil portion 40, and at least one of the first coil portion 40 and the second coil portion 90 includes the edgewise coil 10, 10X, and the core has any configuration.

Figure 15:
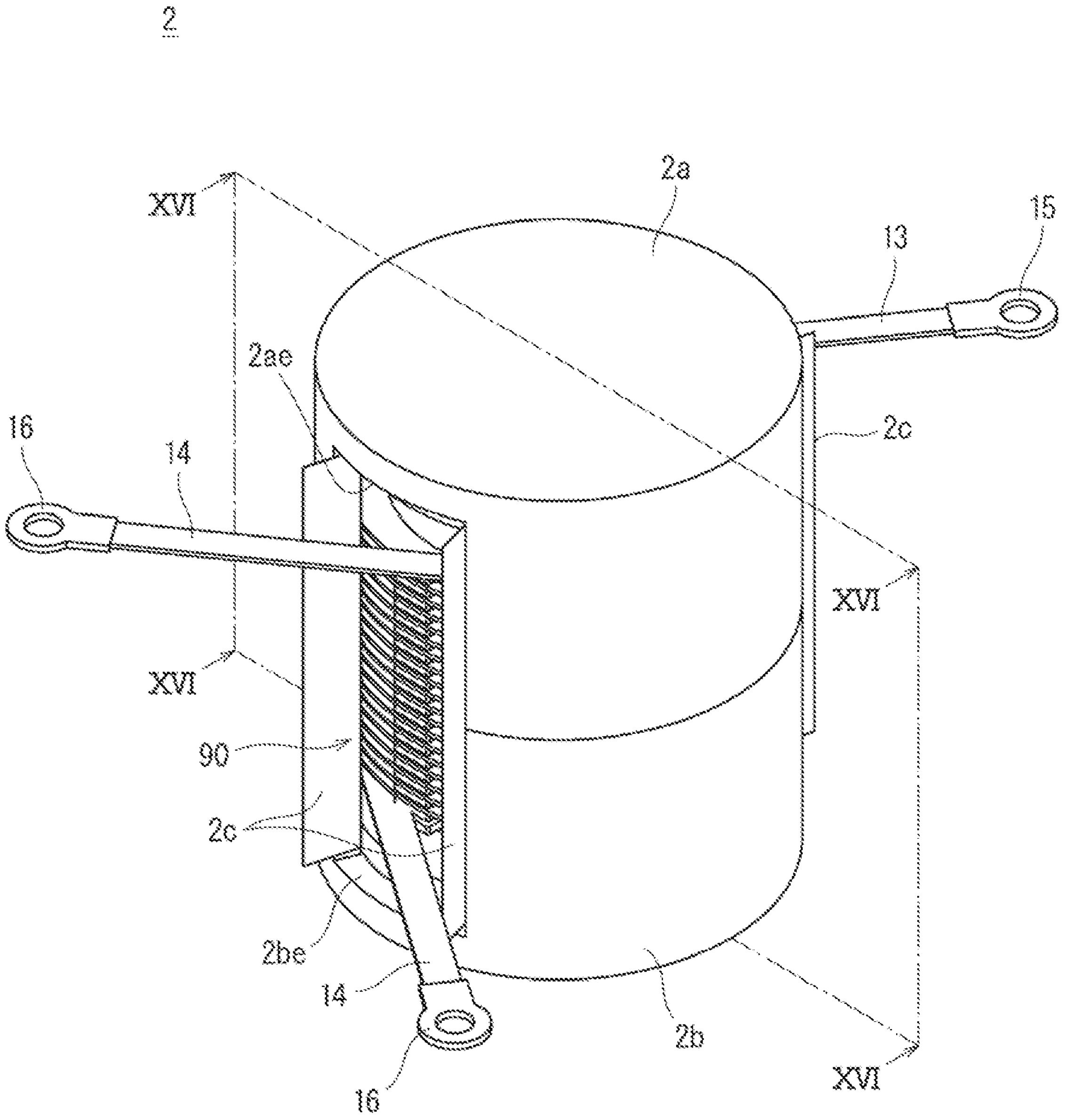
FIG. 15 is a perspective view illustrating a transformer according to a second exemplary embodiment.
Figure 16:
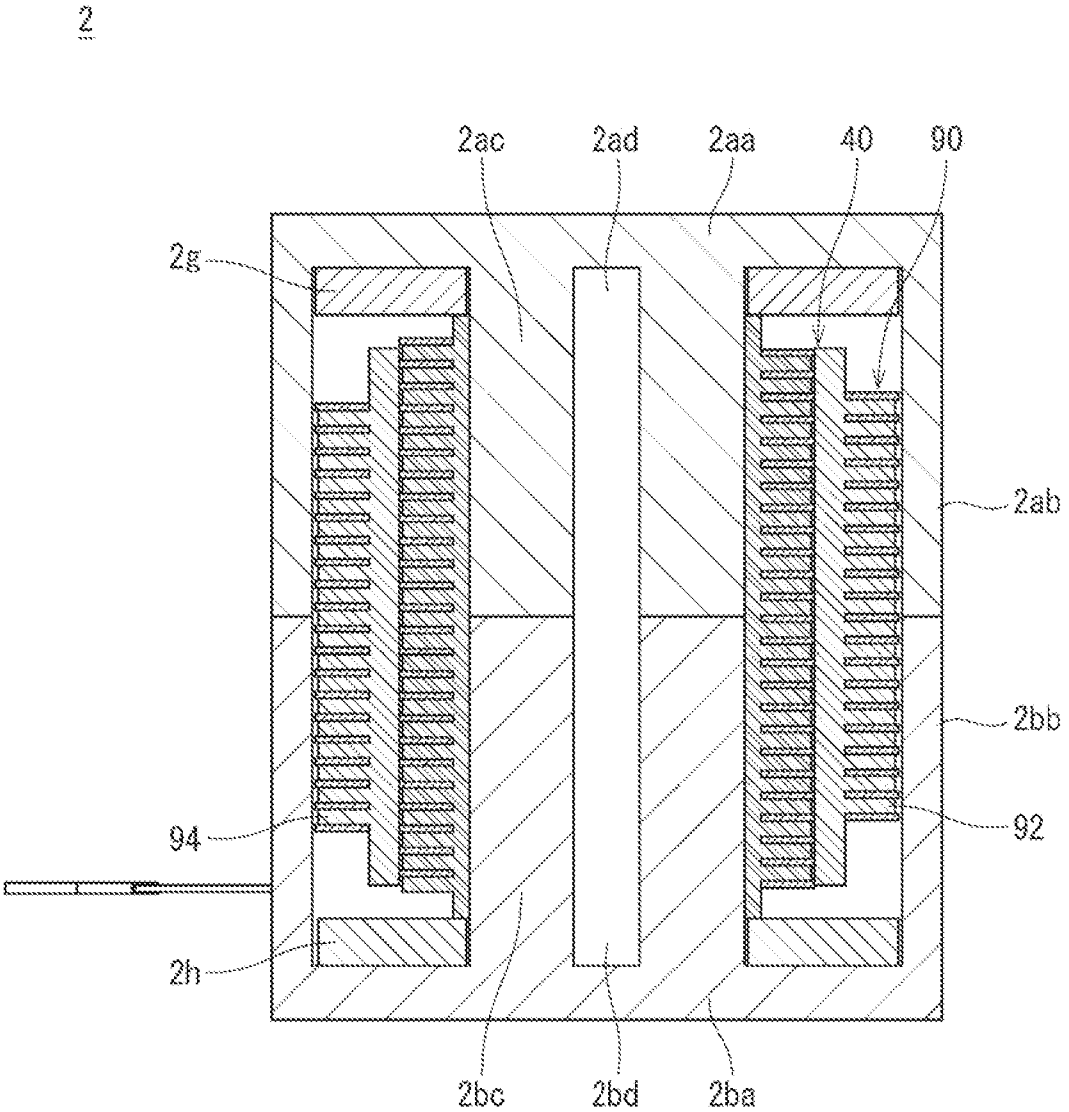
FIG. 16 is a vertical sectional view illustrating a transformer according to the second exemplary embodiment, taken along the cross section XVI-XVI in FIG. 15.

In this regard, a transformer 2 including a pot core according to a second exemplary embodiment will be described with reference to FIGS. 15 and 16. FIG. 15 is a perspective view illustrating the transformer 2 according to the second exemplary embodiment. FIG. 16 is a vertical sectional view illustrating the transformer 2 according to the second exemplary embodiment, taken along the cross section XVI-XVI in FIG. 15.

As illustrated in FIGS. 15 and 16, the transformer 2 is mainly composed of: the first coil portion 40; the second coil portion 90 disposed radially outside of the first coil portion 40 so as to cover part of the outer periphery of the first coil portion 40; and an upper pot core 2*a* and a lower pot core 2*b* attached so as to sandwich the first coil portion and the second coil portion from above and below.

Configuration of Core

The upper pot core 2*a* and the lower pot core 2*b*, each of which corresponds to the core according to the present invention, are each formed substantially into the character "E" shape in cross section as illustrated in FIG. 16. In addition, the upper pot core 2*a* and the lower pot core 2*b* are formed so as to extend through 360 degrees in the circumferential direction of the portion of the character E extending at the center thereof (with the magnetic legs 2*ac* and 2*bc*, which will be described later, being the center). More over, the upper pot core 2*a* and the lower pot core 2*b* are disposed in a manner such that the surfaces of the cores located on the open side of the character "E" are brought into contact with to form a symmetry with respect to the contacting surface, as illustrated in FIG. 16.

More specifically, the upper pot core 2*a* includes a yoke portion 2*aa* that is formed into a disk shape in FIG. 15 and horizontally extends in the upper portion of the upper pot core 2*a*; a magnetic leg 2*ab* that extends perpendicularly to the yoke portion 2*aa* from the edge of the yoke portion 2*aa*; and a magnetic leg 2*ac* that extends perpendicularly to the yoke portion 2*aa* from the central portion of the yoke portion 2*aa*. In particular, a hollow portion 2*ad* is formed at the center of the magnetic leg 2*ac*. In the magnetic leg 2*ac*, the hollow portion 2*ad* extends in the axial direction of the magnetic leg 2*ac* from the open-end side of the upper pot core 2*a* to the same position as the inner bottom end on the other side.

Furthermore, as illustrated in FIG. 15, in the magnetic leg 2*ab*, two opening portions 2*ae* are formed, one of which is located on the front side (on the front side when viewed in the direction of the arrow XVI) in FIG. 15, the other of which is located on the rear surface side. These openings 2*ae* are provided to allow the outwardly extending piece 13, which is the end piece of the edgewise coil 10, as well as the outwardly extending piece 14, which is the end piece of the edgewise coil 10X, to extend outside of the upper pot core 2*a*. These openings 2*ae* each have an angular edge having an inverted U shape when viewed from the front and from the rear. Strictly speaking, these openings 2*ae* are used for the outwardly extending piece 13 on the upper side of the pair of outwardly extending pieces 13 located on the upper and lower sides and the outwardly extending piece 14 on the upper side of the pair of outwardly extending pieces 14 located on the upper and lower sides, to extend outside of the upper pot core 2*a*.

Similarly, the lower pot core 2*b* includes a yoke portion 2*ba* that is formed into a disk shape and horizontally extends in the lower portion of the lower pot core 2*b*; a magnetic leg 2*bb* that extends perpendicularly to the yoke portion 2*ba* from the edge of the yoke portion 2*ba*; and a magnetic leg 2*bc* that extends perpendicularly to the yoke portion 2*ba* from the central portion of the yoke portion 2*ba*. In particular, a hollow portion 2*bd* is formed at the center of the magnetic leg 2*bc*. In the magnetic leg 2*bc*, the hollow portion 2*bd* extends in the axial direction of the magnetic leg 2*bc* from the open-end side of the lower pot core 2*b* to the same position as the inner bottom surface.

Furthermore, as illustrated in FIG. 15, in the magnetic leg 2*bb*, two opening portions 2*be* are formed, one of which is located on the front side (on the front side when viewed in the direction of the arrow XVI) in FIG. 15, the other of which is located on the rear surface side, as with the magnetic leg 2*ab*. These opening portions 2*be* are provided to allow the outwardly extending piece 13, which is the end piece of the edgewise coil 10, as well as the outwardly extending piece 14, which is the end piece of the edgewise coil 10X, to extend outside of the lower pot core 2*b*. These opening portions 2*be* each have an angular edge having a U shape when viewed from the front and from the rear. Strictly speaking, these opening portions 2*be* are used for the outwardly extending piece 13 on the lower side of the pair of outwardly extending pieces 13 located on the upper and lower sides and the outwardly extending piece 14 on the lower side of the pair of outwardly extending pieces 14 located on the upper and lower sides, to extend outside of the lower pot core 2*b*.

Two paper-like insulating spacers 2*c* made out of non-magnetic material with the aim of reducing an influence of magnetic field from the outside are provided along substantially the entire vertical direction of part of the inner side surface of the upper pot core 2*a* and the lower pot core 2*b* so as to cover the outside of the second coil portion 90 and the outside of insulating plates 2*g*, 2*h*, which will be described later, in the radial direction thereof.

One of the insulating spacers 2*c* is disposed on one of the side of each of the upper pot core 2*a* and the lower pot core 2*b* in side direction when viewed from the front, in a state where the upper pot core 2*a* and the lower pot core 2*b* are brought into contact with each other so that the opening portion 2*ae* and the opening portion 2*be* overlap with each other. The other insulating space 2*c* is disposed on the opposite side of each of the upper pot core 2*a* and the lower pot core 2*b* in side direction when viewed from the front. These two insulating spacers 2*c* are disposed along the inner side surface of the upper pot core 2*a* and the lower pot core 2*b* from the front surface to the rear surface, and stick out toward the outside of the upper pot core 2*a* and the lower pot core 2*b* from the opening portions 2*ae* and 2*be* on the front surface and the rear surface.

The upper pot core 2*a* and the lower pot core 2*b* are disposed in a manner such that the magnetic leg 2*ac* and the magnetic leg 2*bc* are inserted into the bobbin body 20*a*, and these legs are brought into contact with each other from above and below in FIG. 16 so that the opening portion 2*ae* and the opening portion 2*be* overlap with each other, thereby forming the transformer 2. In other words, the bobbin body 20*a* of the first coil portion 40 is disposed so as to cover the magnetic leg 2*ac* and the magnetic leg 2*bc* provided at the center of the upper pot core 2*a* and the lower pot core 2*b*, respectively. The outer diameters of the magnetic leg 2*ac* and the magnetic leg 2*bc* are each formed to be smaller than the inner diameter of the bobbin body 20*a* so that the magnetic leg 2*ac* and the magnetic leg 2*bc* can be inserted into the bobbin body 20*a*. In addition, the magnetic leg 2*ab* and the magnetic leg 2*bb* are brought into contact with each other from above and below radially outside of the second coil portion 90.

The upper pot core 2*a* and the lower pot core 2*b*, each serving as a core, form a three-dimensionally continuous loop core that has a doughnut shape as a whole in a state where these cores are brought into contact with each other. With the transformer 2 having the loop core as described above, it is possible to reduce leakage flux by forming a closed magnetic circuit.

The insulating plates 2*g* and 2*h*, each of which serves as an insulating portion, are disposed in the vicinity of the end portion of each of the edgewise coils 10 and 10X in the first coil portion 40 and the second coil portion 90, respectively. More specifically, the insulating plates 2*g* and 2*h* are each formed into a disk shape having a through hole at the center thereof, and are disposed so as to be along the inner bottom surfaces of the upper pot core 2*a* and the lower pot core 2*b*, respectively.

The magnetic leg 2*ac* of the upper pot core 2*a* is caused to pass through the through hole portion at the center of the insulating plate 2*g*, so that the insulating plate 2*g* is disposed on the base end side of the magnetic leg 2*ac* and above the first coil portion 40 and the second coil portion 90. The magnetic leg 2*bc* of the lower pot core 2*b* is caused to pass through the through hole portion at the center of the insulating plate 2*h*, so that the insulating plate 2*h* is disposed on the base end side of the magnetic leg 2*bc* and below the first coil portion 40 and the second coil portion 90. In other words, the insulating plates 2*g* and 2*h* are disposed so as to surround the magnetic legs 2*ac*, 2*bc*, respectively.

The transformer 2 has the insulating plates 2*g* and 2*h* as described above, thereby preventing the edgewise coils 10 and 10X from being brought into contact with the upper pot core 2*a* and the lower pot core 2*b* to maintain an electrically insulating state.

In the exemplary embodiments, description has been made of the transformer 1 including an EE core composed of the upper E core 1*a* and the lower E core 1*b* and the transformer 2 including a pot core composed of the upper pot core 2*a* and the lower pot core 2*b*. However, the core according to the present invention is not limited to these cores. The core according to the present invention may be, for example, an EI core, an ER core, or a PQ core. In addition, the core according to the present invention may be a core provided with gap in order to suppress magnetic saturation. The gap provided in the core may be a gap formed by adding insulating member or may be a gap obtain by forming space.

These are descriptions of each of the exemplary embodiments with reference to the drawings. However, these are merely examples of the present invention, and it may be possible to employ various configurations other than those described above. In addition, it may be possible to combine the exemplary embodiments described above as appropriate without departing from the main points of the present invention.

The present exemplary embodiment includes the following technical ideas.

(1) A transformer, including:

a core;

a first coil portion disposed so as to cover at least part of the core; and a second coil portion disposed so as to cover a periphery of the first coil portion in a direction perpendicular to a central axis of winding of the first coil portion, in which the first coil portion and the second coil portion each include a bobbin and a coil wound around the bobbin, and the coil of at least one of the first coil portion and the second coil portion is an edgewise coil.

(2) The transformer described above, in which the bobbin of at least one of the first coil portion and the second coil portion includes:

a tubular bobbin body; and a plurality of position-limiting protruding portions arranged in a plurality of portions on an outer peripheral surface of the bobbin body and limiting a position of a winding portion of the coil in an axial direction of the bobbin body, and the plurality of position-limiting protruding portions include a first position-limiting protruding portion and a second position-limiting protruding portion that are disposed at positions different from each other in the axial direction of the bobbin body.

(3) The transformer according to any of those described above, in which the edgewise coil includes:

a first winding portion that is in pressure contact with the first position-limiting protruding portion toward the second position-limiting protruding portion; and a second winding portion that is in pressure contact with the second position-limiting protruding portion toward the first position-limiting protruding portion, and the edgewise coil is in a state of space winding in which individual winding portions from the first winding portion to the second winding portion are spaced apart from each other in the axial direction of the bobbin body.

(4) The transformer according to any of those described above, in which the first coil portion and the second coil portion each include a bobbin body, and the bobbin body of the second coil portion is formed so as to have a thickness larger than the thickness of the bobbin body of the first coil portion.

(5) The transformer according to any of those described above, in which an insulating portion is disposed on a periphery of part of the core, and the insulating portion is disposed between the coil of each of the first coil portion and the second coil portion and part of the core that is located on an extended line of an axial direction of the first coil portion and the second coil portion.

(6) The transformer according to any of those described above, in which the core is a loop core formed into an annular shape.

(7) The transformer according to any of those described above, in which the length of the bobbin body of the second coil portion is equal to the axial length obtained by connecting both furthest end portions in the axial direction of the position-limiting protruding portions of the first coil portion.

(8) A method for manufacturing a transformer, which includes the steps of:

preparing a core, a first coil portion that covers at least part of the core; and a second coil portion disposed so as to cover a periphery of the first coil portion in a direction perpendicular to a central axis of winding of the first coil portion, the first coil portion and the second coil portion each including a bobbin and a coil wound around the bobbin, the coil of at least one of the first coil portion and the second coil portion being an edgewise coil;

screwing the bobbin of the first coil portion and the coil of the first coil portion with each other, and screwing the bobbin of the second coil portion and the coil of the second coil portion with each other; and attaching the second coil portion to the outside of the first coil portion in a direction perpendicular to the central axis of winding of the first coil portion, and attaching the core so as to sandwich the first coil portion and the second coil portion in an axial direction of the first coil portion.

(9) The method for manufacturing a transformer described above, in which the bobbin of at least one of the first coil portion and the second coil portion includes:

a tubular bobbin body; and a plurality of position-limiting protruding portions arranged in a plurality of portions on an outer peripheral surface of the bobbin body and limiting a position of a winding portion of the edgewise coil in an axial direction of the bobbin body, the plurality of position-limiting protruding portions include a first position-limiting protruding portion and a second position-limiting protruding portion that are disposed at positions different from each other in the axial direction of the bobbin bod, and in the screwing step, the edgewise coil is wound around the bobbin by screwing the bobbin and the edgewise coil with each other so that:

the edgewise coil includes:

a first winding portion that is in pressure contact with the first position-limiting protruding portion toward the second position-limiting protruding portion and a second winding portion that is in pressure contact with the second position-limiting protruding portion toward the first position-limiting protruding portion; and the edgewise coil is in a state of space winding in which individual winding portions from the first winding portion to the second winding portion are spaced apart from each other in the axial direction of the bobbin body.

(10) The method for manufacturing a transformer according to any of those described above, in which the screwing step is performed while the edgewise coil is being caused to extend in the axial direction of the bobbin body using drag that each of the winding portions of the edgewise coil receives from the plurality of position-limiting protruding portions.

This application is based on Japanese Patent Application No. 2017-067729, filed on Mar. 30, 2017, the entire content of which is incorporated hereinto by reference.

The invention claimed is:

1. A method for manufacturing a transformer, which comprises the steps of:

preparing a core, a first coil portion that covers at least part of the core, and a second coil portion disposed so as to cover a periphery of the first coil portion in a first direction perpendicular to a central axis of winding of the first coil portion, the first coil portion including a first bobbin and a first coil wound around the first bobbin, the second coil portion including a second bobbin and a second coil wound around the second bobbin, at least one of the first coil and the second coil being an edgewise coil;

screwing the first bobbin to the first coil, and screwing the second bobbin to the second coil; and attaching the second coil portion to an outside of the first coil portion in the first direction, and attaching the core so as to sandwich the first coil portion and the second coil portion in an axial direction of the first coil portion, wherein at least one of the first bobbin and the second bobbin includes:

a tubular bobbin body; and a plurality of position-limiting protruding portions arranged in a plurality of portions on an outer peripheral surface of the tubular bobbin body and limiting a position of a winding portion of the edgewise coil in an axial direction of the tubular bobbin body, the plurality of position-limiting protruding portions include a first position-limiting protruding portion and a second position-limiting protruding portion that are disposed at positions different from each other in the axial direction of the tubular bobbin body, and in the screwing step, the edgewise coil is wound around the at least one of the first bobbin and the second bobbin by screwing the at least one of the first bobbin and the second bobbin to the edgewise coil so that:

the edgewise coil includes:

a first winding portion that is in pressure contact with the first position-limiting protruding portion toward the second position-limiting protruding portion; and a second winding portion that is in pressure contact with the second position-limiting protruding portion toward the first position-limiting protruding portion; and the edgewise coil is in a state of space winding in which individual winding portions from the first winding portion to the second winding portion are spaced apart from each other in the axial direction of the tubular bobbin body.

2. The method for manufacturing a transformer according to claim 1, wherein the screwing step is performed while the edgewise coil is being caused to extend in the axial direction of the tubular bobbin body using drag that each of the winding portions of the edgewise coil receives from the plurality of position-limiting protruding portions.

* * * * *